US011566814B2

(12) United States Patent
Makimura et al.

(10) Patent No.: US 11,566,814 B2
(45) Date of Patent: Jan. 31, 2023

(54) REGISTER

(71) Applicants: HOWA PLASTICS CO., LTD., Toyota (JP); KABUSHIKI KAISHA TOYOTA JIDOSHOKKI, Kariya (JP); TOYOTA JIDOSHA KABUSHIKI KAISHA, Toyota (JP)

(72) Inventors: Hidekazu Makimura, Toyota (JP); Yosuke Matsuzawa, Toyota (JP); Ryo Nagahashi, Kariya (JP); Atsushi Yamaguchi, Kariya (JP); Naoyuki Takahashi, Toyota (JP)

(73) Assignees: HOWA PLASTICS CO., LTD., Toyota (JP); KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 651 days.

(21) Appl. No.: 16/459,710

(22) Filed: Jul. 2, 2019

(65) Prior Publication Data
US 2020/0011568 A1 Jan. 9, 2020

(30) Foreign Application Priority Data
Jul. 3, 2018 (JP) .............................. JP2018-126590

(51) Int. Cl.
*F24F 13/24* (2006.01)
*B60H 1/34* (2006.01)
(Continued)

(52) U.S. Cl.
CPC ......... *F24F 13/24* (2013.01); *B60H 1/00507* (2013.01); *B60H 1/34* (2013.01); *F24F 13/14* (2013.01); *B60H 2001/006* (2013.01)

(58) Field of Classification Search
CPC ...... F24F 13/24; F24F 13/14; B60H 1/00507; B60H 1/34; B60H 1/3428; B60H 2001/00714; B60H 2001/3478
(Continued)

(56) References Cited

U.S. PATENT DOCUMENTS

2015/0231946 A1* 8/2015 Bianchi ................... F24F 13/24
264/267
2015/0360536 A1* 12/2015 Terai .................. B60H 1/00678
454/143
(Continued)

FOREIGN PATENT DOCUMENTS

EP 2433826 A1 * 3/2012 ......... B60H 1/00564
JP H03-200418 A 9/1991
(Continued)

OTHER PUBLICATIONS

May 31, 2022 Notice of Reasons for Refusal issued in Japanese Patent Application No. 2018-126590.
Nov. 2, 2022 Notification of the First Office Action issued in Chinese Patent Application No. 201910589569.9.
Nov. 29, 2022 Notice of Reasons for Refusal issued in Japanese Patent Application No. 2018-126590.

*Primary Examiner* — Steven B McAllister
*Assistant Examiner* — Charles R Brawner
(74) *Attorney, Agent, or Firm* — Oliff PLC

(57) ABSTRACT

Provided is a register that can more surely suppress abnormal noise caused by air passing through a space between a damper and a retainer. An inner wall of an upper side wall of the retainer is formed with a plurality of rib parts provided on a downstream side relative to an outer periphery on the downstream side of a plate member in a closed state of a damper. The plurality of rib parts is arranged in a direction parallel to a turning axis of the damper, and adjacent rib parts are formed into different shapes. A soft seal member is
(Continued)

provided with a plurality of protrusion parts on an upper surface of the outer periphery on the downstream side of the plate member.

4 Claims, 34 Drawing Sheets

(51) Int. Cl.
*B60H 1/00* (2006.01)
*F24F 13/14* (2006.01)

(58) Field of Classification Search
USPC .......................................................... 454/358
See application file for complete search history.

(56) References Cited

U.S. PATENT DOCUMENTS

| | | | |
|---|---|---|---|
| 2016/0229540 A1* | 8/2016 | Loukusa | B60H 1/00564 |
| 2017/0160024 A1* | 6/2017 | Trizila | F28F 9/026 |
| 2017/0248237 A1* | 8/2017 | Kabierschke | F16K 1/2261 |

FOREIGN PATENT DOCUMENTS

| | | | |
|---|---|---|---|
| JP | 09066735 A | * | 3/1997 |
| JP | H09-300943 A | | 11/1997 |
| JP | 2570855 Y2 | | 5/1998 |
| JP | 2004-314794 A | | 11/2004 |
| JP | 2017-193236 A | | 10/2017 |

* cited by examiner

REGISTER

CROSS-REFERENCE TO RELATED APPLICATIONS

This application is based upon and claims the benefit of priority of the prior Japanese Patent Application No. 2018-126590, filed on Jul. 3, 2018, the entire contents of which are incorporated herein by reference.

FIELD

The present invention relates to a register provided with a damper in a ventilation flue of a retainer.

BACKGROUND

Conventionally, a register is arranged in an instrument panel of a vehicle such as an automobile. The register blows out air conditioning air from an air blow outlet into a cabin of the vehicle. A ventilation flue to blow the air conditioning air is formed in a retainer of the register. A damper to control air conditioning air is provided inside the retainer disclosed in the Patent Literature 1. The damper disclosed in the Patent Literature 1 includes a plate part pivotally supported by left and right side walls of the retainer and a damper seal provided around the plate part. The damper is turned inside the retainer by the damper opening/closing mechanism and blows out the air conditioning air and stops the air blowout.

Specifically, when the damper stops blowing out the air conditioning air, the damper is turned so that an upper inner wall and a lower inner wall of the retainer are elastically brought into contact with each other. Thus, the ventilation flue inside the retainer can be closed by the damper. In contrast, when the air conditioning air is allowed to blow out, the damper is turned to form a space between the damper seal and the upper inner wall, the lower inner wall of the retainer, thereby blowing out the air conditioning air from the air blow outlet into the cabin of the vehicle through the formed space.

When such a small space is formed between the damper and the inner wall of the retainer in the register provided with this type of the damper, abnormal noise such as wind noise may be generated when the air conditioning air passing through the formed space. In the damper disclosed in the Patent Literature 1, the damper seal attached to outer periphery of the damper has a rugged shape. Since the damper seal has the rugged shape, vortex flows are generated by a flow of the air conditioning air passing between the damper and the inner wall of the retainer to suppress generation of the abnormal noise. Also, in a register disclosed in the Patent Literature 2, protrusion parts are formed on an upper side inner wall of a retainer. The protrusion parts are formed into a rectangular parallelepiped shape extending in a direction parallel to an end on the downstream side of a damper. The protrusion parts interrupt a flow of air conditioning air passing between a space between the damper and an inner wall of a retainer and suppresses generation of the abnormal noise.

[Patent Literature 1] Japanese Examined Utility Model (Registration) Application Publication No. 2570855 (paragraph 0006)

[Patent Literature 2] Japanese Laid-open Patent Publication No. 1991-200418

SUMMARY

However, in the register provided with this type of the damper, the abnormal noise may be generated depending on an outer peripheral shape of the damper and a shape of the inner wall of the retainer. Accordingly, there is room for improvement to further suppress the generation of the abnormal noise.

The present disclosure has been made to solve the above-mentioned problems and has an object to provide a register capable of more surely suppressing generation of abnormal noise caused by air passing a space between a damper and a retainer.

In order to accomplish the above object, according to one aspect of the present disclosure, it is provided a register comprising: a retainer having a cylindrical shape and provided with a ventilation flue that allows air to flow in a ventilating direction; a damper provided inside the retainer and turnably supported by the retainer to open and close the ventilation flue following turning of the damper, wherein the damper includes a plate member formed into a flat plate shape, a shaft part supporting the plate member turnably around a turning axis with respect to the retainer; and a soft seal member provided in an outer periphery of the plate member, wherein the retainer includes an inner wall elastically brought into contact with the soft seal member provided in the outer periphery on a downstream side of the plate member in the ventilating direction in a closed state of the damper, wherein the inner wall is formed with a plurality of rib parts provided on a downstream side relative to the outer periphery on the downstream side of the plate member in the closed state of the damper, wherein the plurality of rib parts are arranged in a direction parallel to the turning axis, and the adjacent ribs are formed into different shapes, and wherein the soft seal member is provided with a plurality of protrusion parts in the outer periphery on the downstream side of the plate member and on a surface facing the plurality of rib parts when the damper is arranged along the ventilating direction.

The object and advantages of the invention will be realized and attained by means of the elements and combinations particularly pointed out in the claims.

It is to be understood that both the forgoing general description and the following detailed description are exemplary and explanatory and are not restrictive of the invention.

DESCRIPTION OF EMBODIMENTS

For example in a register as described above, a register comprising: a retainer having a cylindrical shape and provided with a ventilation flue that allows air to flow in a ventilating direction; a damper provided inside the retainer and turnably supported by the retainer to open and close the ventilation flue following turning of the damper, wherein the damper includes a plate member formed into a flat plate shape, a shaft part supporting the plate member turnably around a turning axis with respect to the retainer; and a soft seal member provided in an outer periphery of the plate member, wherein the retainer includes an inner wall elastically brought into contact with the soft seal member provided in the outer periphery on a downstream side of the plate member in the ventilating direction in a closed state of the damper, wherein the inner wall is formed with a plurality of rib parts provided on a downstream side relative to the outer periphery on the downstream side of the plate member in the closed state of the damper, wherein the plurality of rib parts are arranged in a direction parallel to the turning axis, and the adjacent ribs are formed into different shapes, and wherein the soft seal member is provided with a plurality of protrusion parts in the outer periphery on the downstream side of the plate member and on a surface facing the plurality of rib parts when the damper is arranged along the ventilating direction. According to the register in the present application, the rib parts and the protrusion parts can more surely suppress the abnormal noise caused by the air passing through the space between the damper and the retainer.

1. The First Embodiment

Figure 1:
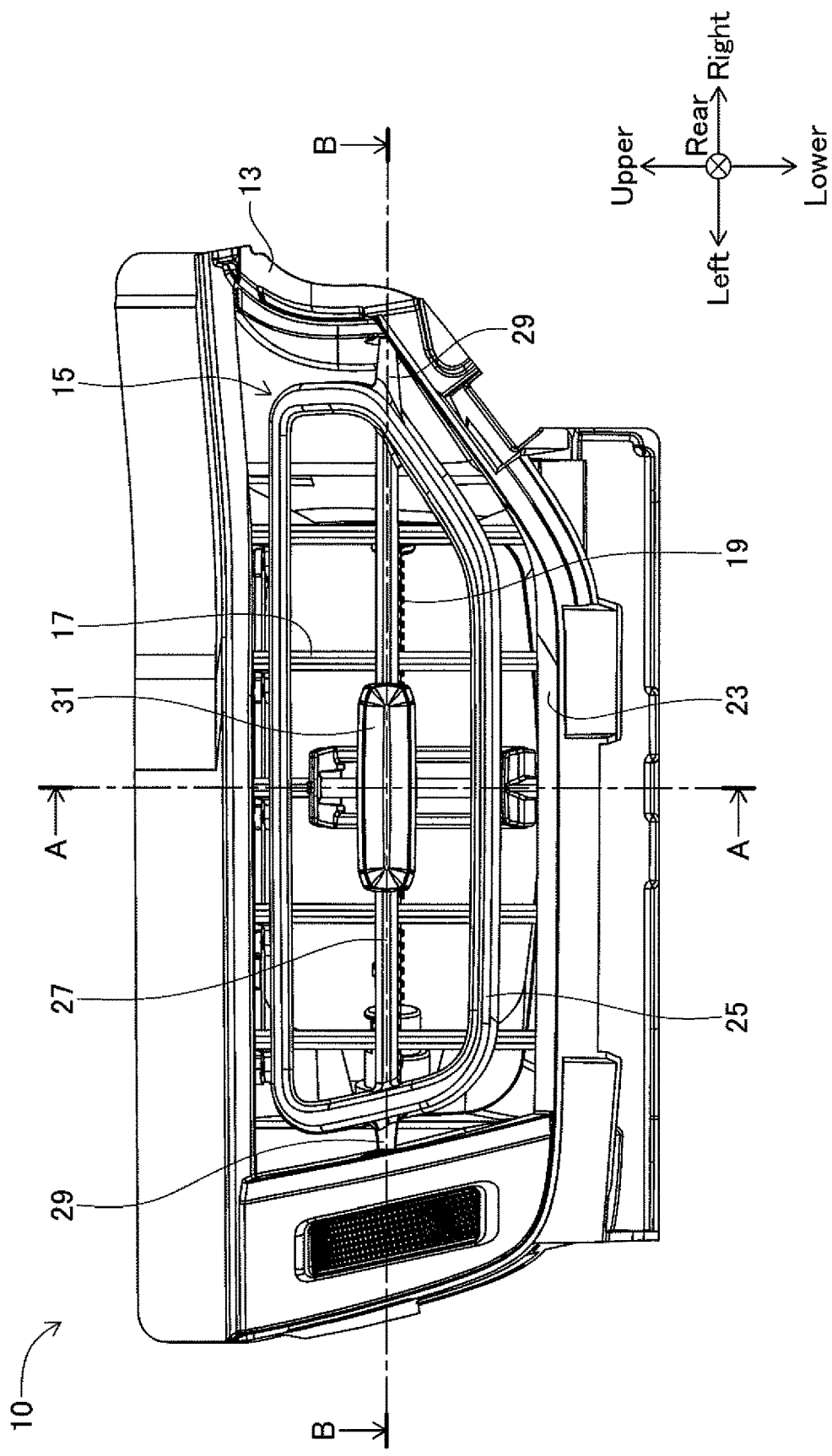
FIG. 1 is a front view of a register illustrating the first embodiment.
Figure 2:
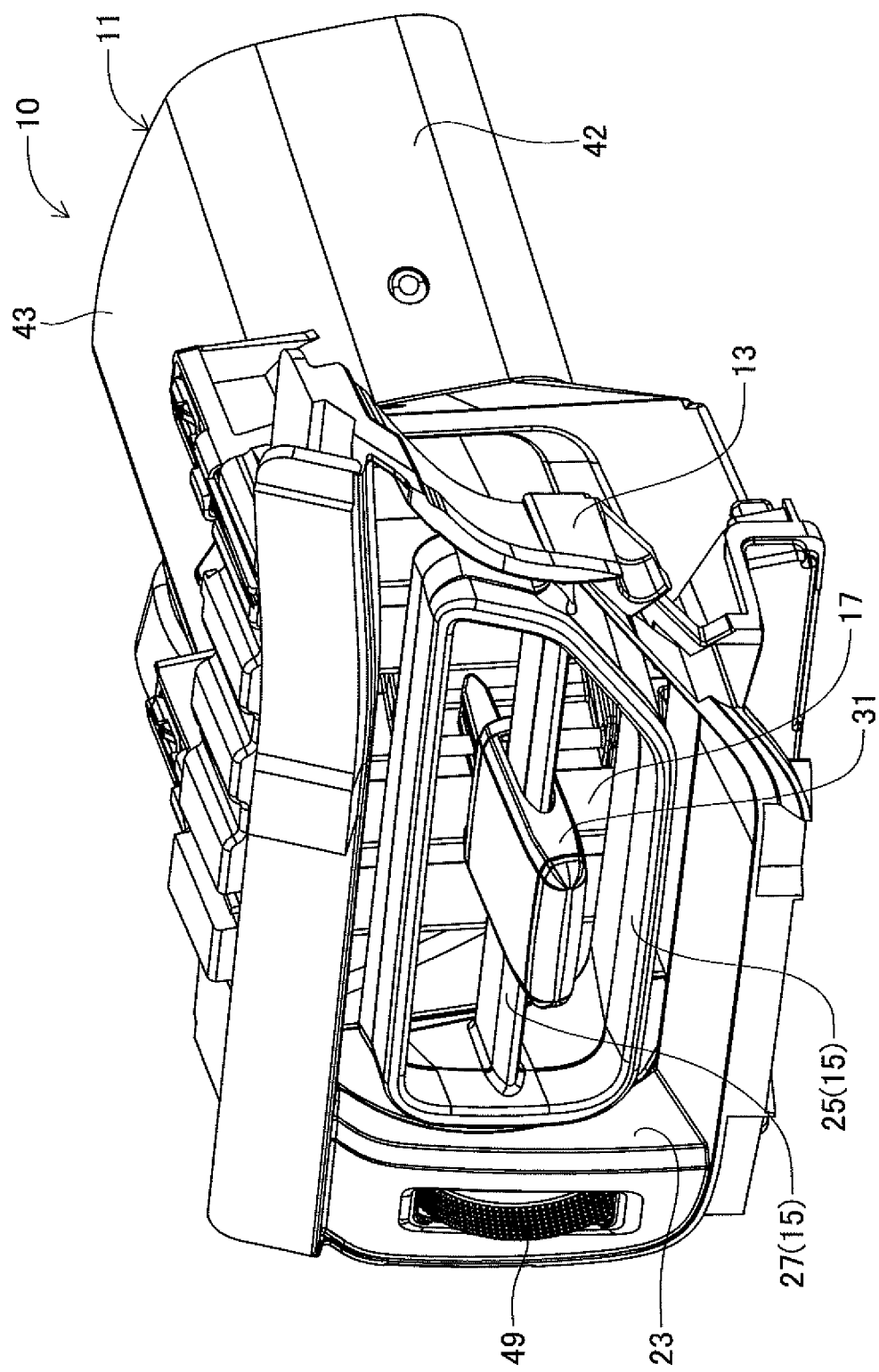
FIG. 2 is a perspective view of the register seen from the right front side.
Figure 3:
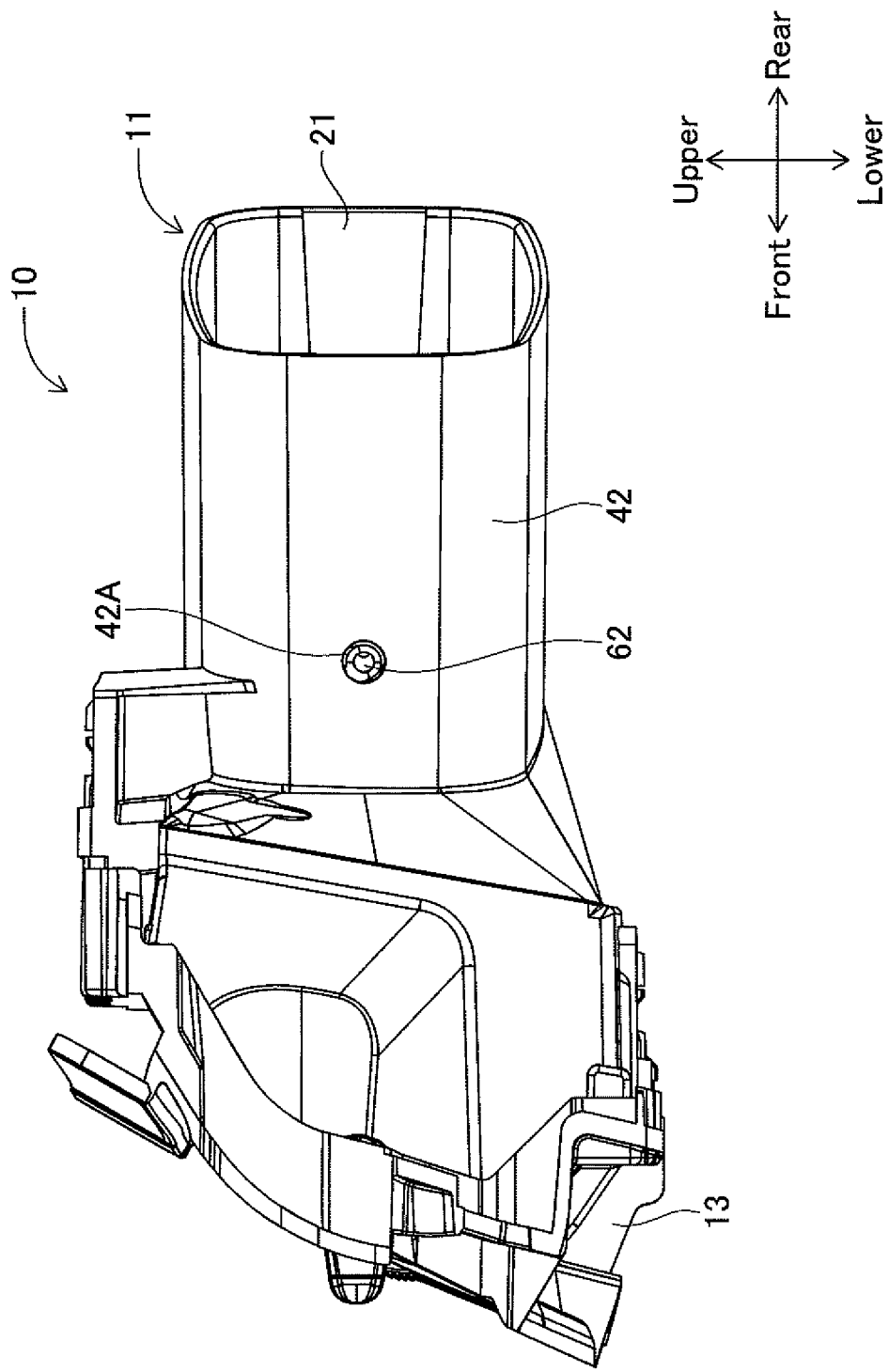
FIG. 3 is a right side view of the register.

Hereinafter, a register 10 according to one embodiment of the present invention will be described with reference to drawings. The register 10 is arranged in an instrument panel disposed on the front side of a vehicle compartment of an automobile etc. and blows out air conditioning air adjusted by an air conditioner inside the vehicle compartment. In the description below, as illustrated in FIG. 1, a downstream side in a ventilating direction in the register 10 (i.e. a vehicle compartment side) is the front side, and an upstream side in the ventilating direction (i.e. an air conditioner side) is the rear side. In addition, in the description below, the vertical direction and the lateral direction are defined for explanation using a user's view point facing the register 10 on the front side of the register 10.

2. Structure of the Register

The register 10 according to the present embodiment blows out the conditioning air adjusted by the air conditioner inside the vehicle compartment. As illustrated in FIGS. 1-6, the register 10 includes a retainer 11, a bezel 13, a front fin 15, rear fins 17, and a damper 19 etc. The retainer 11 has a cylindrical shape extending in the front-rear direction. A ventilation flue 21 is formed inside the retainer 11. A rear end of the retainer 11 is connected to the air conditioner (not shown) via the ventilation flue 21. A narrow air blow outlet 23 long in the lateral direction is formed in the bezel 13. The retainer 11 has the cylindrical shape communicating with the air blow outlet 23 of the bezel 13, and blows the air conditioning air in a direction toward the air blow outlet 23 i.e. a ventilating direction 22. The ventilation flue 21 (retainer 11) has a cross-sectional shape taken along a plane orthogonal to the ventilating direction 22, the cross-sectional shape formed in a substantially rectangular shape long in the lateral direction. The retainer 11 has the cylindrical shape bent in a direction of forming a prescribed angle to the front-rear direction (in the present embodiment, the rear side aslant on the right) (see FIG. 6). This shape enables the air conditioning air flowing toward the ventilating direction 22 in the ventilation flue 21 to hit an inner wall of the bent retainer 11, and then accelerate.

The bezel 13 is a member arranged on a front surface of the retainer 11. The air blow outlet 23 of the bezel 13 has a shape long in the lateral direction and a narrow and long shape short in the vertical direction, and a width thereof is narrow in the vertical direction at a right side portion (see FIG. 1). The front fin 15 is arranged inside the air blow outlet 23 of the bezel 13. The front fin 15 includes an annular fin portion 25 and a guide fin 27 provided inside the annular fin portion 25. The annular fin portion 25 is formed into an annular shape bent along an inner periphery of the air blow outlet 23. The front fin 15 is turnably attached to the bezel 13 and the retainer 11 by a fin shaft 29. The front fin 15 turns toward the vertical direction and changes a wind direction by vertically operating an operation knob 31 attached to the guide fin 27.

A plurality of the rear fins 17 (in the present embodiment, five) are arranged on an upstream side of the front fin 15. Each of the rear fins 17 has a substantially plate shape extending in the vertical direction and having a plane along the vertical direction and the front-rear direction. The plurality of the rear fins 17 are turnable with respect to the bezel 13 and the retainer 11 by fin shafts 33 (see FIG. 5). The central rear fin 17 in the lateral direction is drivingly connected to the operation knob 31. The central rear fin 17 turns in the lateral direction in accordance with slide-movement of the operation knob 31 in the lateral direction. The plurality of rear fins 17 are connected with each other, and when the central rear fin 17 turns in the lateral direction, the other all rear fins 17 interlockingly turn in the lateral direction to change the wind direction. The shapes and structures of the front fin 15 and the rear fin 17 are one example. For example, the front fin 15 may be replaced with horizontal fins all of which are along the lateral direction without the annular fin portion 25. Alternatively, the retainer 11 may include only either of the front fin 15 or the rear fins 17.

3. Structure of Operating the Damper 19

As illustrated in FIGS. 7-10, the retainer 11 is formed into a substantially rectangular cylindrical shape long in the lateral direction and is enclosed by four side walls. In the description below, a side wall on the left side, a side wall on the right side, a side wall on the upper side, and a side wall on the lower side forming the retainer 11 are respectively referred to as a left side wall 41, a right side wall 42, an upper side wall 43, and a lower side wall 44. The ventilation flue 21 is enclosed by the four side walls. A left side shaft hole 41A having a circular section is formed in the left side wall 41. A right side shaft hole 42A having a circular section smaller than the left side shaft hole 41A is formed in the right side wall 42. The left side shaft hole 41A faces the right side shaft hole 42A in the lateral direction interposing the ventilation flue 21 therebetween. The left side shaft hole 41A and the right side shaft hole 42A turnably support the damper 19.

Figure 4:
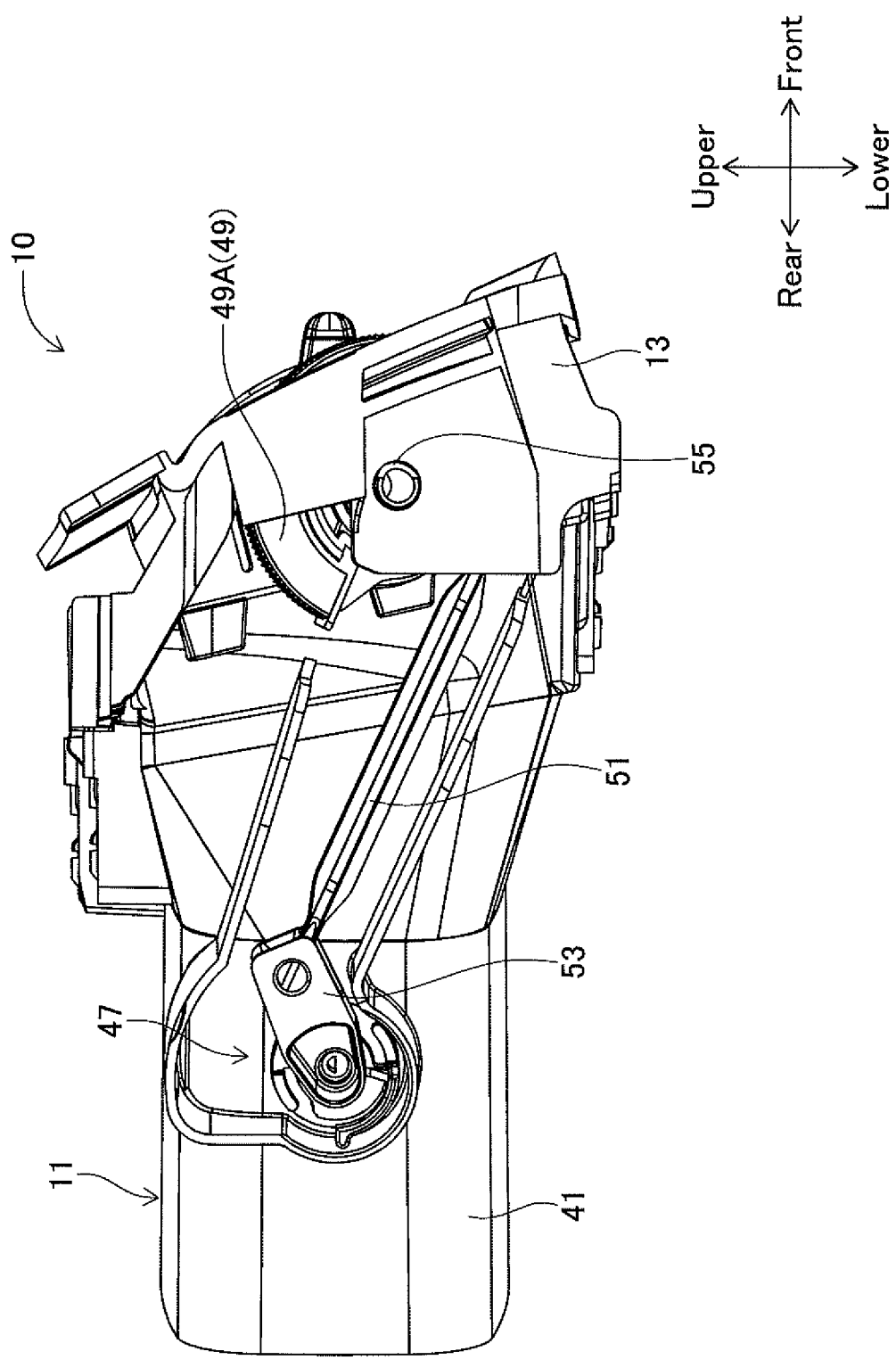
FIG. 4 is a left side view of the register.
Figure 8:
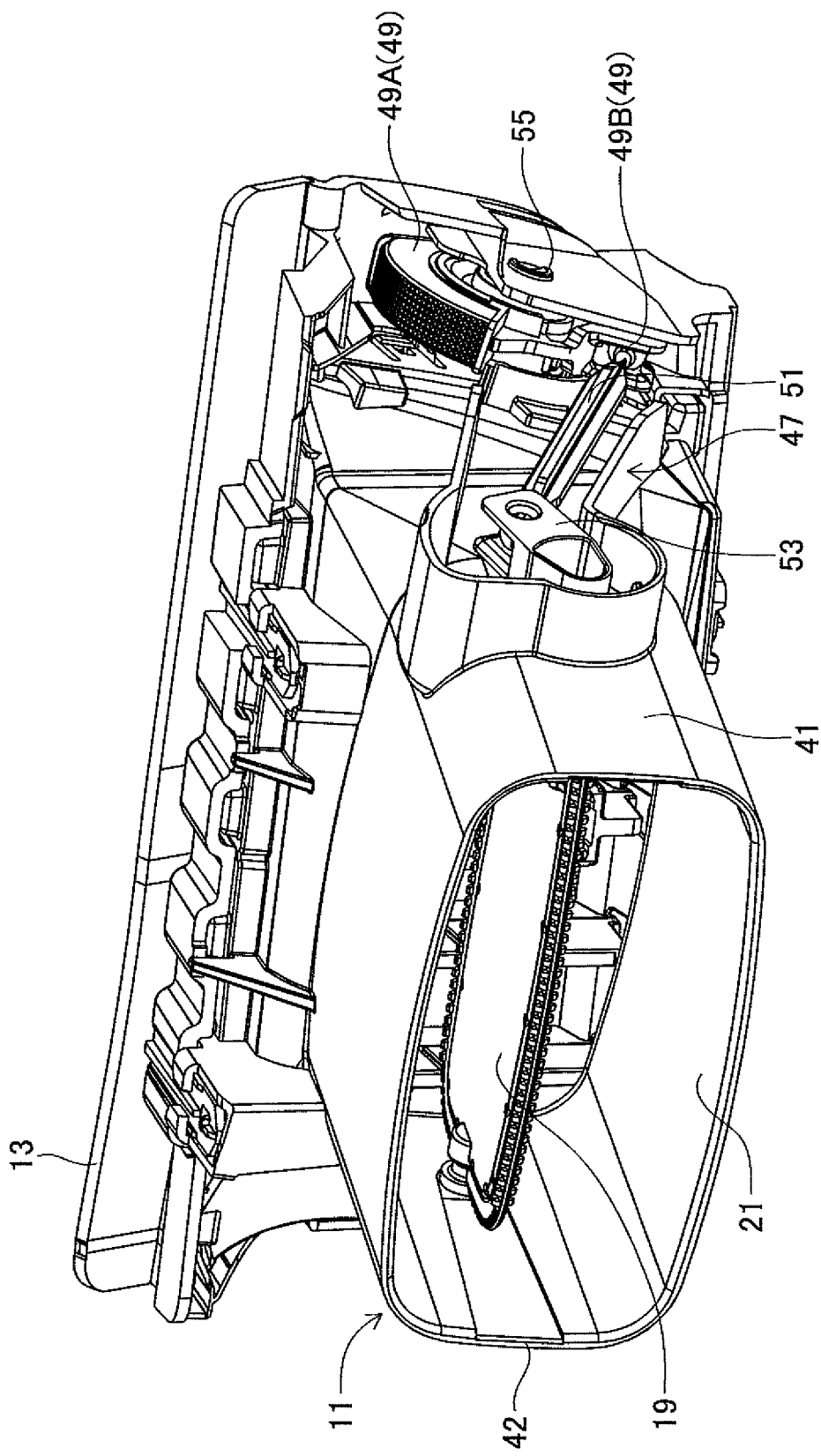
FIG. 8 is a perspective view of the register seen from the left rear side.
Figure 9:
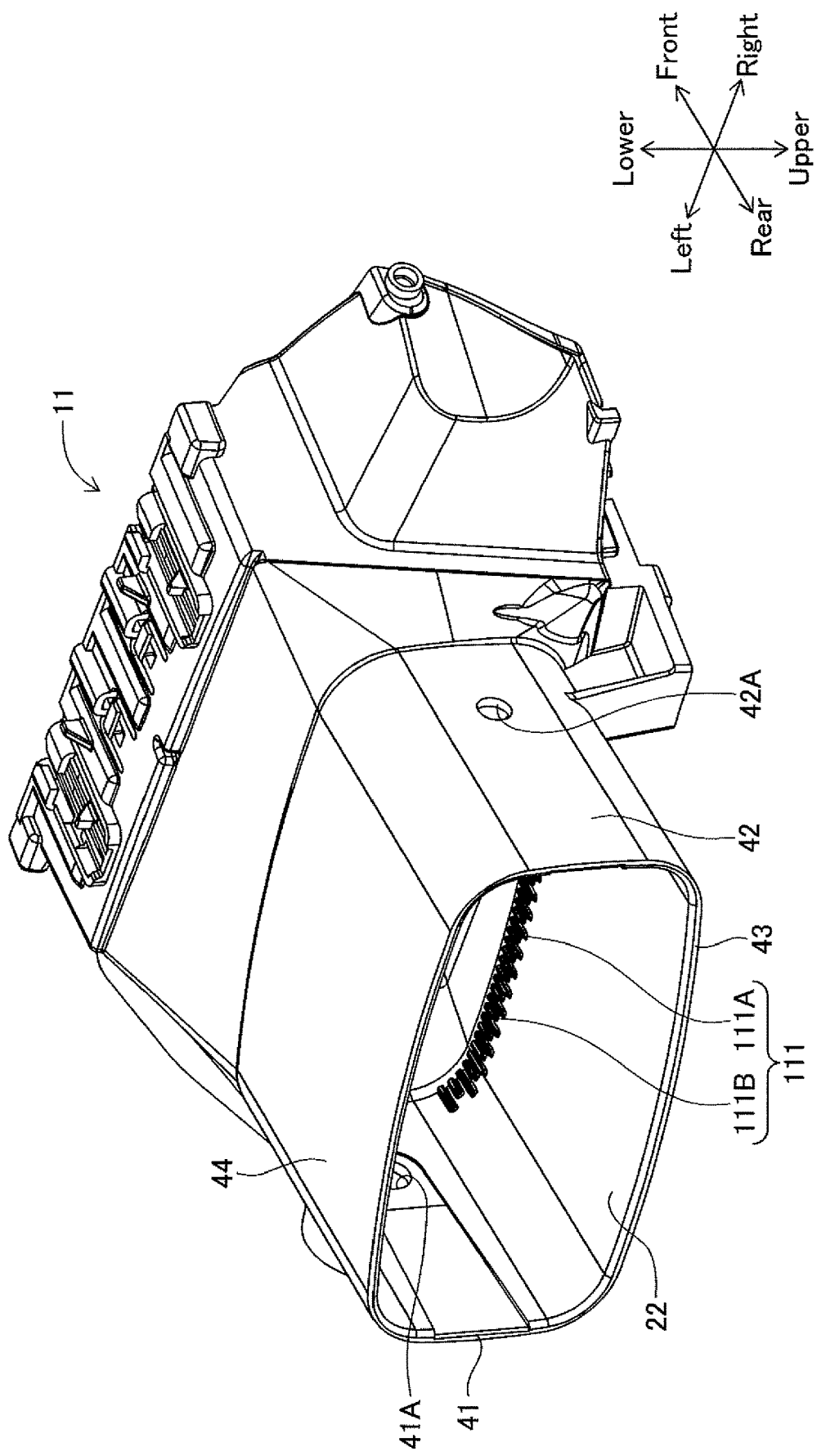
FIG. 9 is a perspective view of the retainer seen from the right rear side and the lower side.

As illustrated in FIGS. 4 and 8, an opening and closing operation part 47 is arranged at a left side part of the retainer 11. The opening and closing operation part 47 is used for operation of the damper 19, and includes a knob member 49, a link member 51, and a shaft side coupling member 53. The knob member 49 is turnably supported by a shaft part 55 formed at a front end part of the left side wall 41 of the retainer 11. The knob member 49 includes an operation knob part 49A having a circular arc shape and a first coupling part 49B. The first coupling part 49B is formed opposite to the operation knob 49A in the knob member 49 having a substantially circular plate shape and is coupled to a front end of the link member 51.

Figure 6:
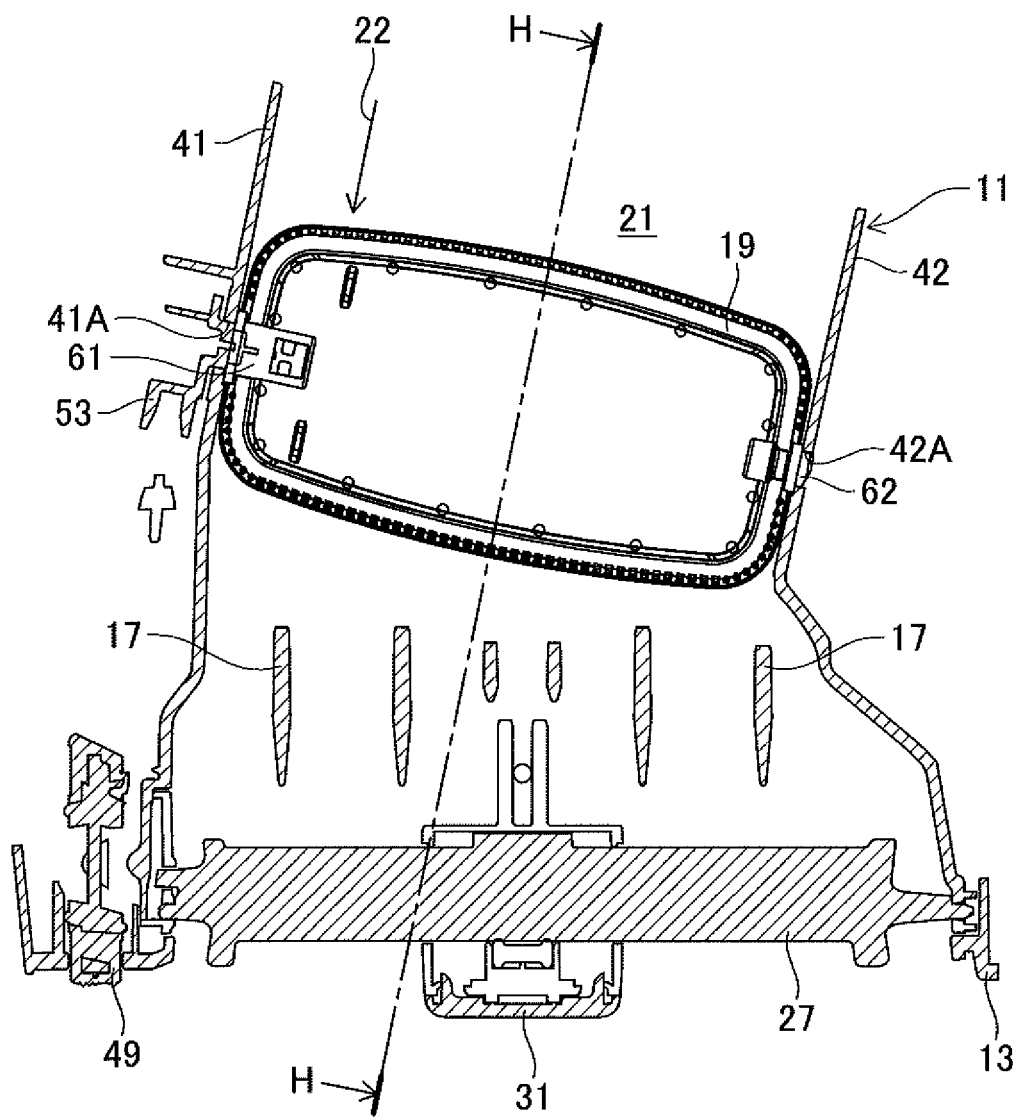
FIG. 6 is a sectional view illustrating a section taken along a line B-B of FIG. 1.

The shaft side coupling member 53 is attached to a left side shaft part 61 of the damper 19 via the left side shaft hole 41A of the left side wall 41 and is turnable around the left side shaft hole 41A (see FIG. 6). A rear end of the link member 51 is coupled to the shaft side coupling member 53. The damper 19 is pivotally supported by the left side shaft part 61 and the right side shaft part 62 so as to be turnable by inserting a right side shaft part 62 into the right side shaft hole 42A. The opening and closing operation part 47 transmits a driving force to the shaft side coupling member 53 by the link member 51 in accordance with operation of turning the operation knob part 49A of the knob member 49 to turn the shaft side coupling member 53 around the left side shaft hole 41A. The damper 19 turns inside the ventilation flue 21 following the turning of the shaft side coupling member 53 to open and close the ventilation flue 21.

4. Structure of the Damper

Figure 5:
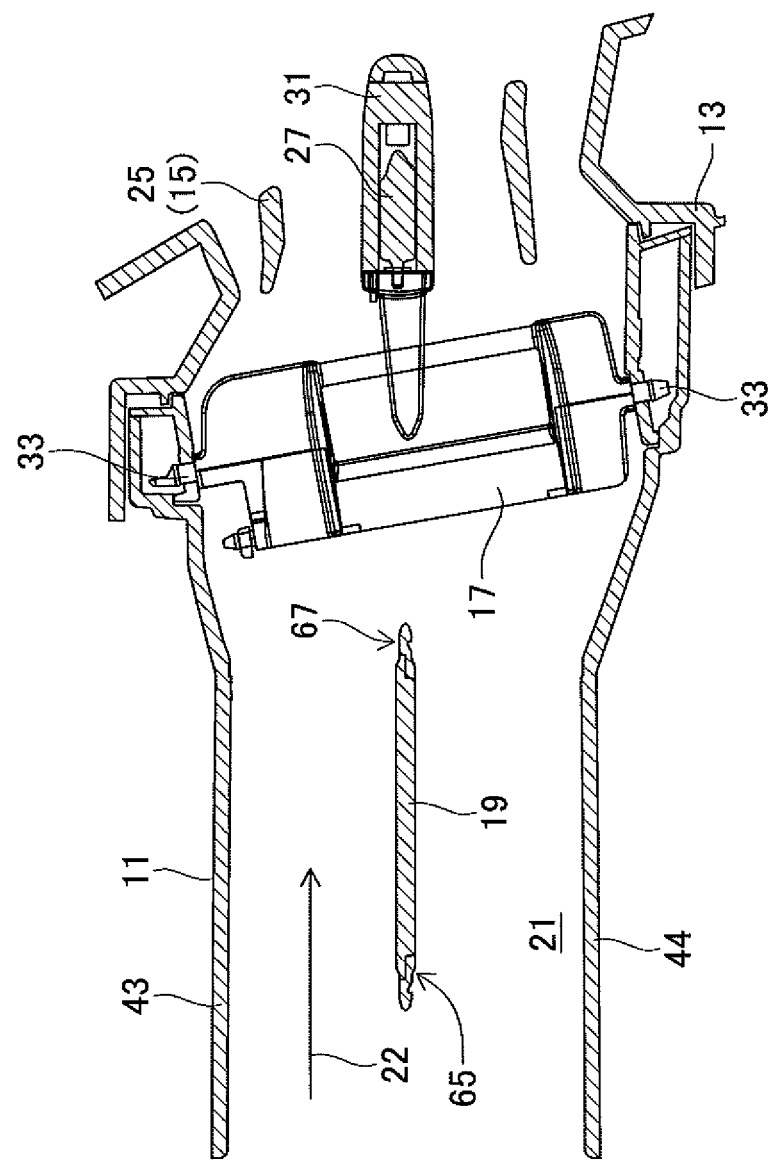
FIG. 5 is a sectional view illustrating a section taken along a line A-A of FIG. 1.
Figure 11:
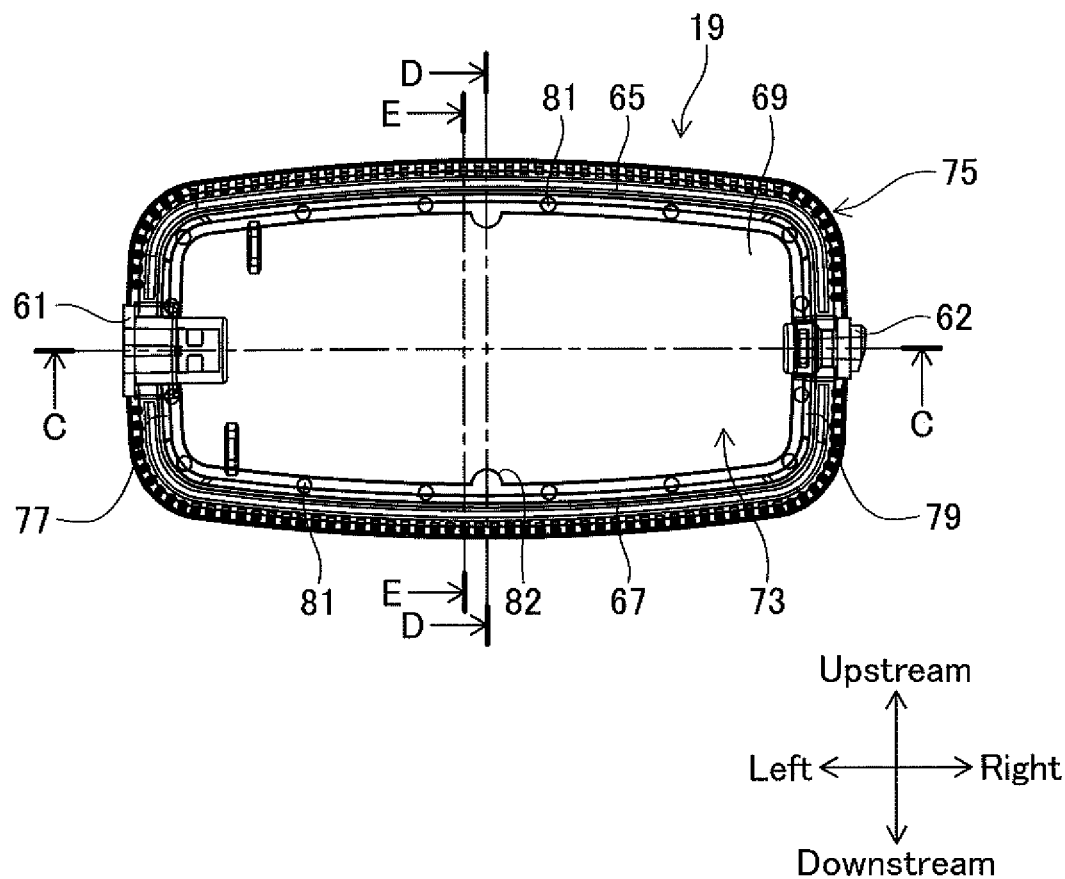
FIG. 11 is a top view of a damper.
Figure 12:
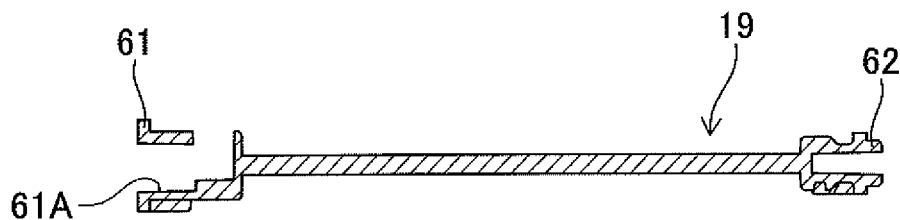
FIG. 12 is a sectional view illustrating a section taken along a line C-C of FIG. 11.
Figure 13:
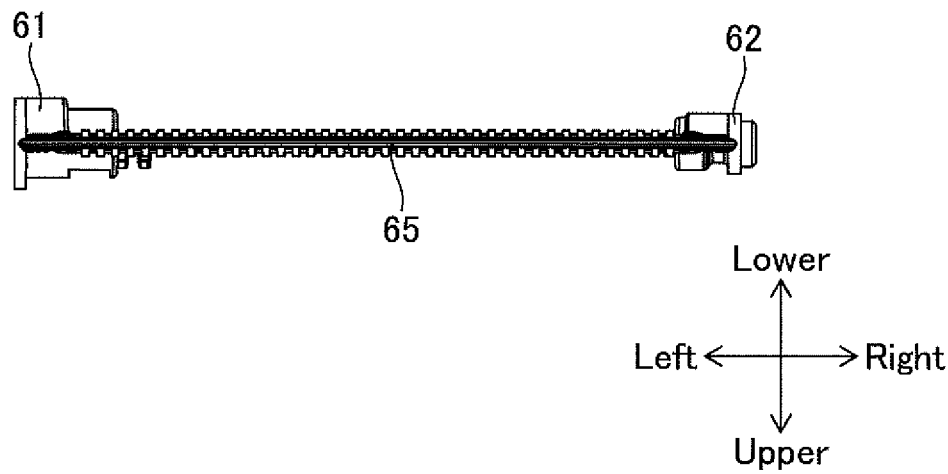
FIG. 13 is a rear view of the damper in a neutral state.
Figure 14:
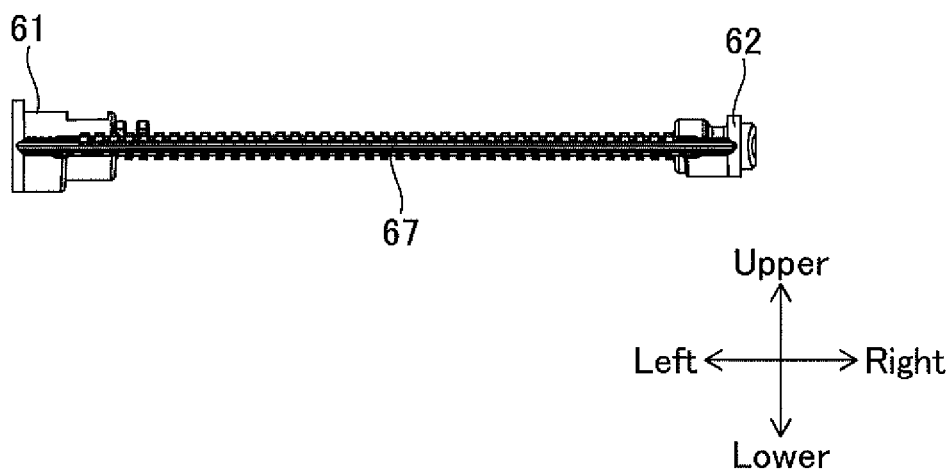
FIG. 14 is a front view of the damper in the neutral state.
Figure 15:
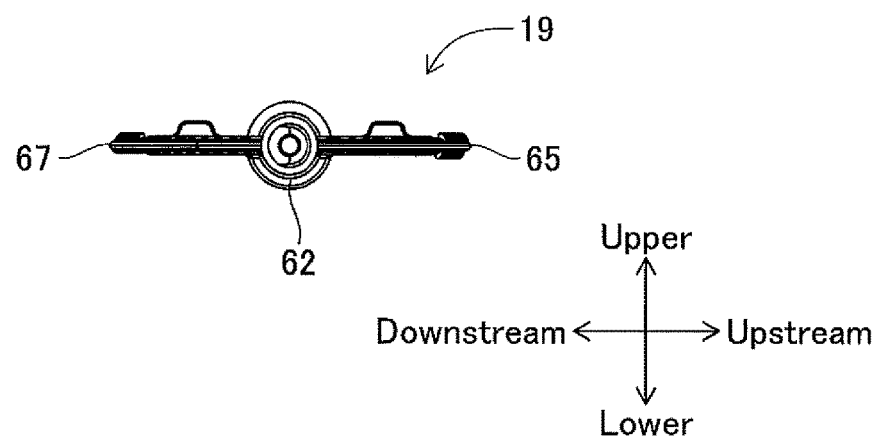
FIG. 15 is a right side view of the damper in the neutral state.
Figure 16:
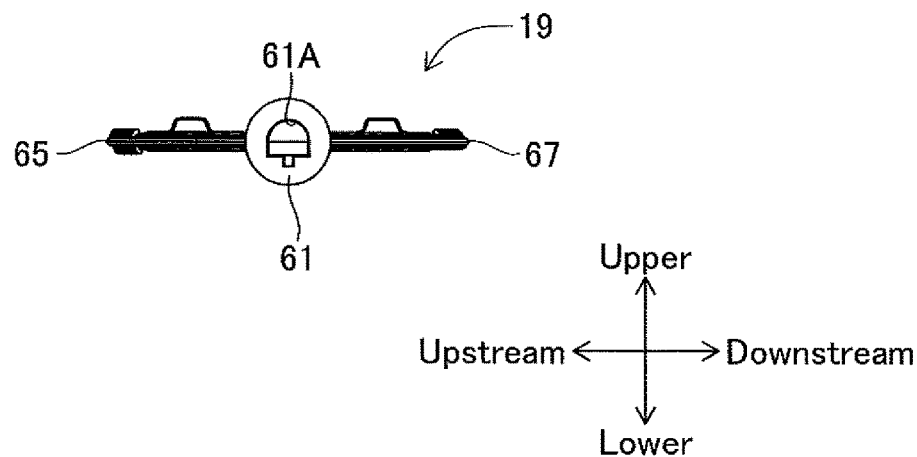
FIG. 16 is a left side view of the damper in the neutral state.
Figure 17:
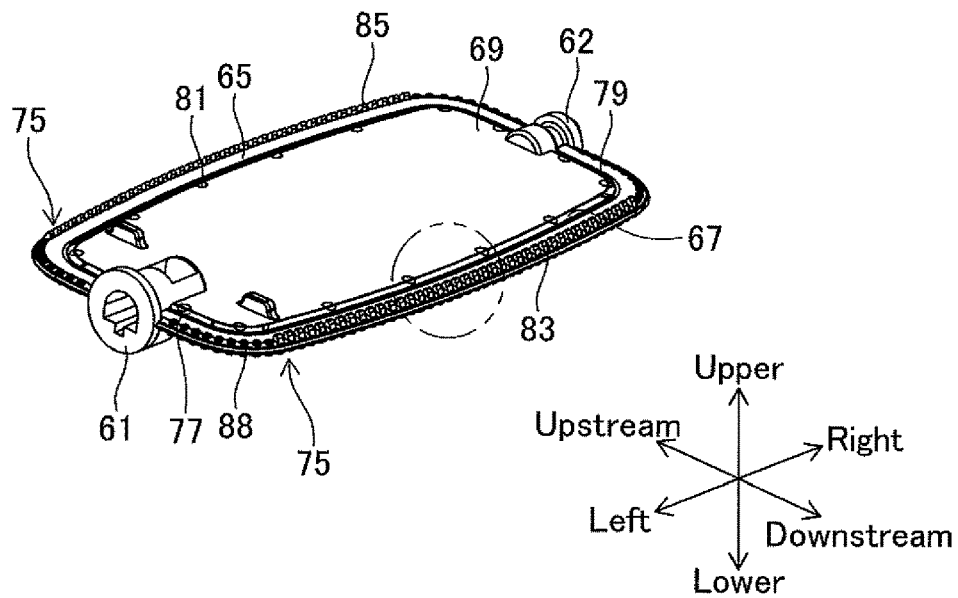
FIG. 17 is a perspective view of the damper in the neutral state seen from a left upper side.
Figure 19:
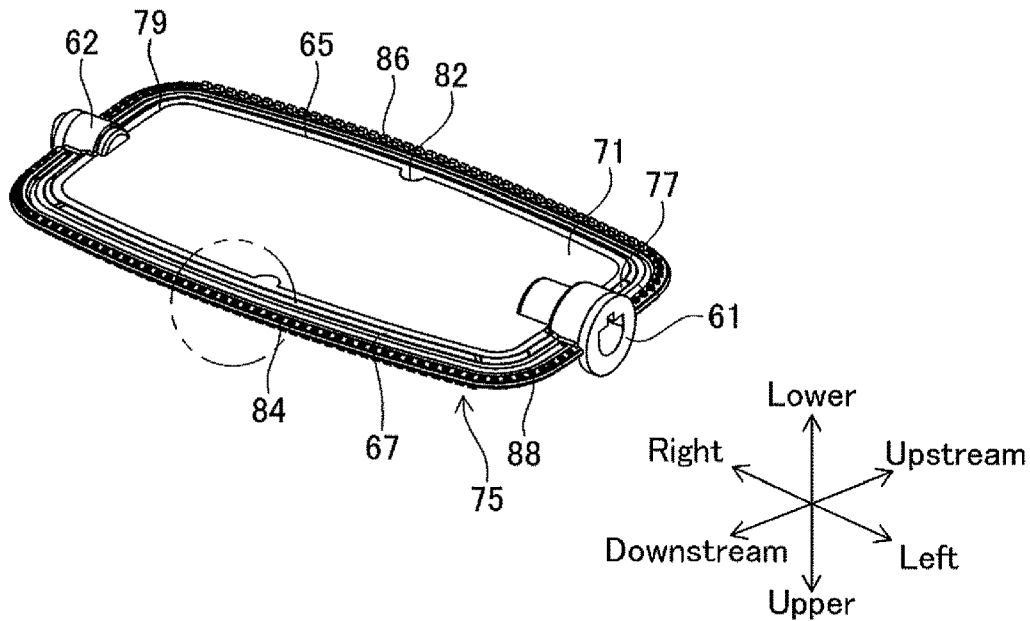
FIG. 19 is a perspective view of the damper in the neutral state seen from a left lower side.

Next, the structure of the damper 19 is described below. In the below description, a state where an outer periphery on the upstream side 65 (see FIG. 17) and an outer periphery on the downstream side 67 (see FIG. 17) of the damper 19 as illustrated in FIGS. 1 and 5 have the same height in the vertical direction is referred to as a neutral state. In addition, surfaces of the damper 19 on the upper and lower sides in the neutral state are respectively referred to as an upper surface 69 (see FIG. 17) and a lower surface 71 (see FIG. 19). In the below description of the damper 19, a position in the neutral state is defined as a reference position. As described above, the retainer 11 has a cylindrical shape bent in a direction of forming a prescribed angle to the front-rear direction (in the present embodiment, the rear side aslant on the right) (see FIG. 6). The damper 19 supported by the retainer 11 also inclines to the direction of forming the prescribed angle to the front-rear direction. Accordingly, in the below description of the damper 19, as illustrated in FIGS. 11, 17, and 19 etc., the ventilating direction 22 (upstream and downstream) to the damper 19 in the neutral state is defined as a reference. A direction orthogonal to the ventilating direction 22 and parallel to a plane of the damper 19 is referred to as the lateral direction. A direction orthogonal to the ventilating direction 22 and the lateral direction (direction orthogonal to the upper surface 69 and the lower surface 71) is referred to as the vertical direction.

As illustrated in FIGS. 11-16, the damper 19 includes a plate member 73, the left side shaft part 61, the right side shaft part 62, and a soft seal member 75. The damper 19 has, for example, a shape corresponding to a shape of the ventilation flue 21 of the retainer 11. The plate member 73 is formed into a substantially rectangular plate shape long in the lateral direction and is turnably provided inside the ventilation flue 21. The soft seal member 75 is formed in an outer periphery of the plate member 73 and is elastically brought into contact with an inner peripheral wall of the retainer 11 when the ventilation flue 21 is closed.

The damper 19 is formed by a two-color molding including two processes, i.e. a primary molding and a secondary molding. In the primary molding, the plate member 73 is formed by a hard material such as polypropylene including talc. Next, in the secondary molding after the primary molding, the soft seal member 75 is formed in the outer periphery of the plate member 73 formed in the primary molding using a soft material such as olefin-based elastomer. Accordingly, the outer periphery of the hard plate member 73 in the damper 19 is covered with the soft seal member 75. In other words, the soft seal member 75 is formed by the two-color molding in which the plate member 73 primarily molded with the hard material is secondarily molded with the soft material. In this structure, it is not necessary to assemble the soft seal member 75 to the plate member 73 manually, and thus handling becomes easier. The above-mentioned material and manufacturing method of the damper 19 is one example. For example, the damper 19 may be formed by a urethane form including silicon.

The left side shaft part 61 is formed in a left side outer periphery 77, i.e. a left side part of the outer periphery in the damper 19. The left side shaft part 61 is formed at the center in the ventilating direction 22 in the left side outer periphery 77 and has a substantially cylindrical shape long in the lateral direction. A mounting hole 61A for mounting the shaft side coupling member 53 of the opening and closing operation part 47 (see FIG. 4) is formed in the left side shaft part 61. The mounting hole 61 A is recessed from the left side (outside) toward the right side of the left side shaft part 61. The shaft side coupling member 53 is inserted into the mounting hole 61A via the left side shaft hole 41A (see FIG. 6). Thus, the left side shaft part 61 is turnably supported by the left side shaft hole 41A (retainer 11).

The right side shaft part 62 is formed in a right side outer periphery 79, i.e. a right side part of the outer periphery of the damper 19. The right side shaft part 62 is formed at the center in the ventilating direction 22 in the right side outer periphery 79 and has a substantially cylindrical shape long in the lateral direction. The right side (outside) of the right side shaft part 62 has a small (narrow) shaft diameter and is inserted into the right side shaft hole 42A of the right side wall 42 (see FIG. 6). Thus, the damper 19 is pivotally supported by the left side shaft part 61 and the right side shaft part 62 with respect to the retainer 11 so as to be turnable.

The damper 19 has a plurality of anchors 81 in the outer periphery other than the left side shaft part 61 and the right side shaft part 62. The plurality of anchors 81 are formed with a fixed space along the outer periphery of the plate member 73. The anchor 81 is formed by injecting a soft resin (olefin-based elastomer etc.) forming the soft seal member 75 in the secondary molding into a hole formed in the plate member 73 in the primary molding. Thus, the plate member 73 and the soft seal member 75 are firmly fixed with each other by each of the anchors 81. As a result, the soft seal member 75 can be surely prevented from separating from the plate member 73. The anchors 81 are formed on both sides of the upper surface 69 and the lower surface 71 of the plate member 73 and are disposed inside the soft seal member 75 so as not to be visible from outside. FIGS. 11 and 17 etc. transparently illustrate the anchor 81 formed inside the plate member 73. FIGS. 11 and 17 etc. also illustrate a gate remaining part 82 formed by a gate into which a resin material is injected at the two-color molding.

The soft seal member 75 is formed in a frame shape having a substantial rectangle covering the outer periphery of the plate member 73. The soft seal member 75 is curved in the circular arc shape so as to cover the outer periphery of the left side shaft part 61 at a central part of the left side outer periphery 77. The soft seal member 75 is formed into the circular arc shape so as to cover the outer periphery of the right side shaft part 62 at a central part of the right side outer periphery 79. The soft seal member 75 covers a part of an upper surface and a lower surface of the left side shaft part 61 and the right side shaft part 62.

5. Structure of Protrusion Part

Next, the protrusion parts formed in each of the outer periphery on the downstream side 67 and the outer periphery on the upstream side 65 of the soft seal member 75 will be described below. As illustrated in FIGS. 17-24, upper side protrusion parts 83 and lower side protrusion parts 84 are respectively formed on the upper surface 69 side and the lower surface 71 side in the outer periphery on the downstream side 67 of the soft seal member 75 (see FIG. 23). Also, upper side protrusion parts 85 and lower side protrusion parts 86 are respectively formed on the upper surface 69 side and the lower surface 71 side in the outer periphery on the upstream side 65 of the soft seal member 75 (see FIG. 24). The upper side protrusion parts 85 and the lower side protrusion parts 86 of the outer periphery on the upstream side 65 are formed into the same shapes as the upper side protrusion parts 83 of the outer periphery on the downstream side 67. Accordingly, in the below description, the upper side protrusion parts 83 and the lower side protrusion parts 84 of the outer periphery on the downstream side 67 will be mainly explained, and the explanation on the upper side protrusion parts 85 and the lower side protrusion parts 86 of the outer periphery on the upstream side 65 will be appropriately omitted.

Figure 18:
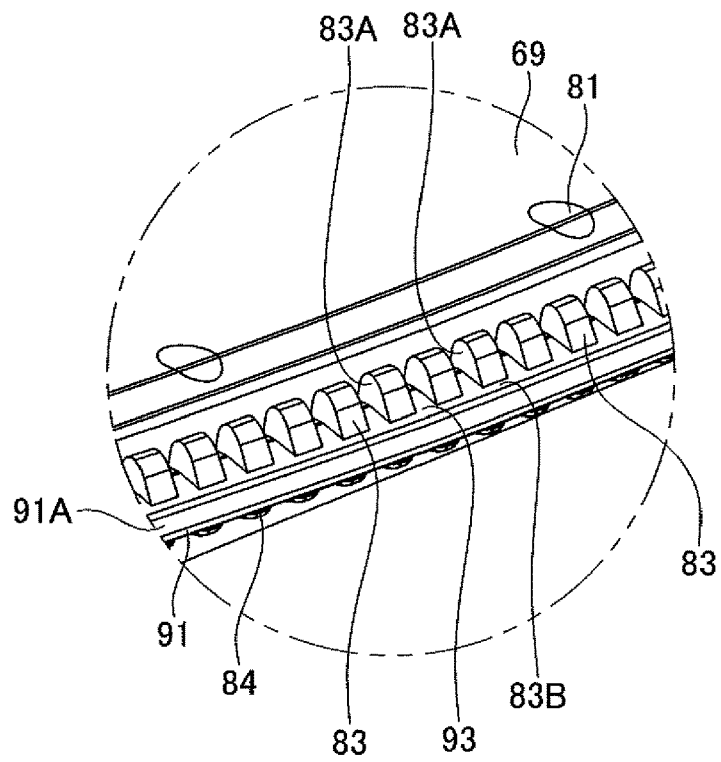
FIG. 18 is an enlarged view of a central part in an outer periphery on a downstream side (upper surface) in FIG. 17.
Figure 23:
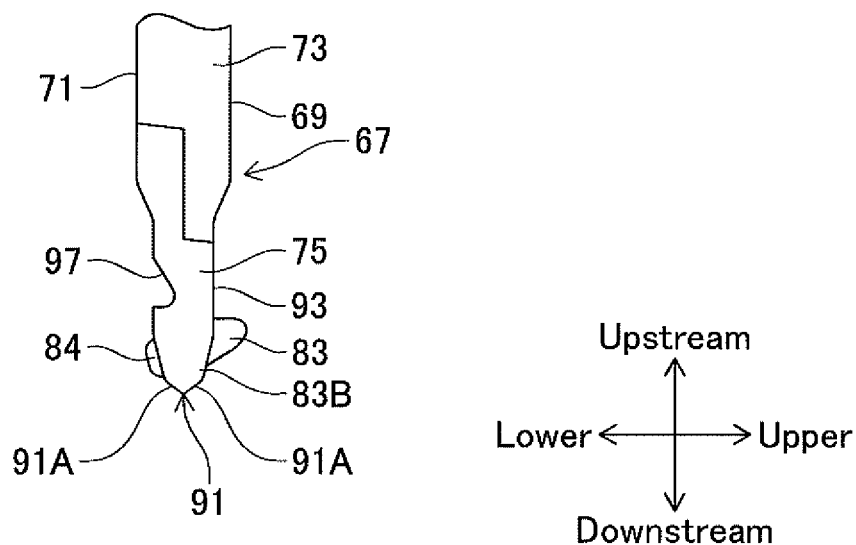
FIG. 23 is an enlarged view of an enlarged area 101 (an outer periphery on a downstream side 67) illustrated in FIG. 22.
Figure 24:
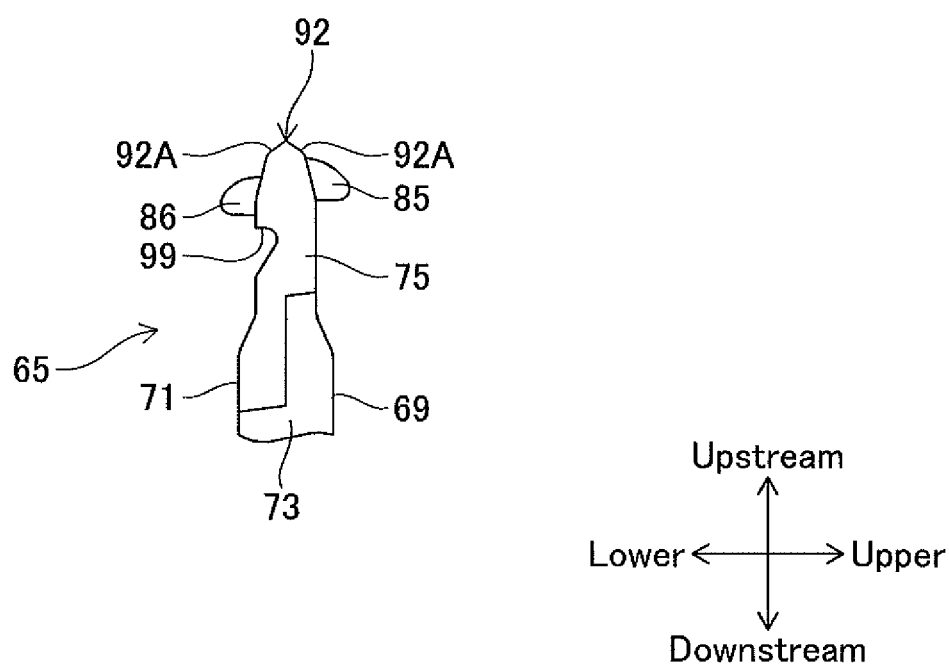
FIG. 24 is an enlarged view of an enlarged area 102 (an outer periphery on an upstream side 65) illustrated in FIG. 22.

As illustrate in FIGS. 17 and 18, each of the upper side protrusion parts 83 is formed on the upper surface 69 and at a part along the lateral direction in the soft seal member 75 of the outer periphery on the downstream side 67. FIG. 23 is an enlarged view of an enlarged area 101 in FIG. 22; and FIG. 24 is an enlarged view of an enlarged area 102 in FIG. 22. As illustrated in FIG. 23, a tip part on the downstream side 91 serving as a tip part on the downstream side of the soft seal member 75 is formed into a shape protruding toward the downstream side. The tip part on the downstream side 91 is formed into a shape gradually tapered from the upstream side toward the downstream side. Thickness of the tip part on the downstream side 91 gets thinner gradually. An inclined surface 91A is formed on each of the upper surface 69 side and the lower surface 71 side of the tip part on the downstream side 91. The inclined surface 91A inclines toward outside in the vertical direction (upper side or lower side) from the downstream side to the upstream side. When the ventilation flue 21 is closed by the damper 19, the tip part on the downstream side 91 is elastically brought into contact with the upper side wall 43 of the retainer 11 from inside (see FIG. 32). Each of the upper side protrusion parts 83 is formed at a position corresponding to a part contacting the upper side wall 43 in the outer periphery on the downstream side 67. Each of the plurality of lower side protrusion parts 84 formed on the lower surface 71 side is formed at a position facing each of the upper side protrusion parts 83 in the vertical direction, i.e. the thickness direction of the damper 19 (see FIG. 18).

Likewise, the upper side protrusion parts 85 on the upstream side are formed on the upper surface 69 and at a part along the lateral direction in the soft seal member 75 of the outer periphery on the upstream side 65. As illustrated in FIG. 24, a tip part on the upstream side 92 of the soft seal member 75 is formed into a gradually tapered shape protruding toward the downstream side as in the case with the tip part on the downstream side 91. An inclined surface 92A is formed on each of the upper surface 69 side and the lower surface 71 side of the tip part on the upstream side 92. The inclined surface 92A inclines toward outside in the vertical direction (upper side or lower side) from the upstream side to the downstream side. When the ventilation flue 21 is closed by the damper 19, the tip part on the upstream side 92 is elastically brought into contact with the lower side wall 44 of the retainer 11 from inside (see FIG. 32). Each of the upper side protrusion parts 85 is formed at a position corresponding to a part contacting the lower side wall 44 in the outer periphery on the upstream side 65. Each of the plurality of lower side protrusion parts 86 formed on the lower surface 71 side is formed at a position facing each of the upper side protrusion parts 85 in the vertical direction. Each of the lower side protrusion parts 86 is formed at a position shifted inside the damper 19 (the lower side of FIG. 24) relative to a position of the upper side protrusion part 85.

As illustrated in FIGS. 17 and 18, each of the upper side protrusion parts 83 is formed in the outer periphery on the downstream side 67 and along the lateral direction with a fixed space. The space of the upper side protrusion part 83 is about 0.1 millimeter to several millimeters. The upper side protrusion part 83 protrudes toward the direction perpendicular to the upper surface 69 (upward). A shape in which the upper side protrusion part 83 is cut in a plane along the ventilating direction 22 and the vertical direction is the circular arc protruding upward. A position of a protruded vertex of the upper side protrusion part 83 is a position shifted to the upstream side. Accordingly, an inclined surface of the upper side protrusion part 83 on the downstream side has a more moderate inclination than an inclined surface on the upstream side. In other words, while the inclined surface of the upper side protrusion part 83 outside the damper 19 is moderate, the inclined surface thereof inside the damper 19 is steep. The upper side protrusion part 85 and the lower side protrusion part 86 on the upstream side have the same shape as the upper side protrusion part 83 on the downstream side. In the upper side protrusion part 83, the outside inclined surface may be steep, and the inside inclined surface may be moderate. The upper side protrusion part 85 and the lower side protrusion part 86 may have the different shapes from the upper side protrusion part 83.

Figure 20:
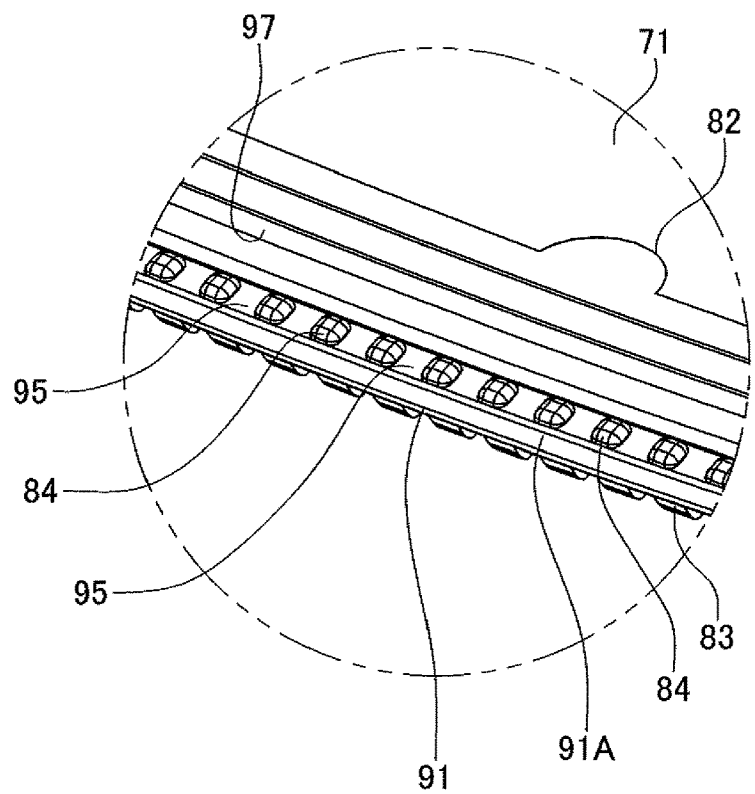
FIG. 20 is an enlarged view of the central part in the outer periphery on the downstream side (lower surface) in FIG. 19.
Figure 21:
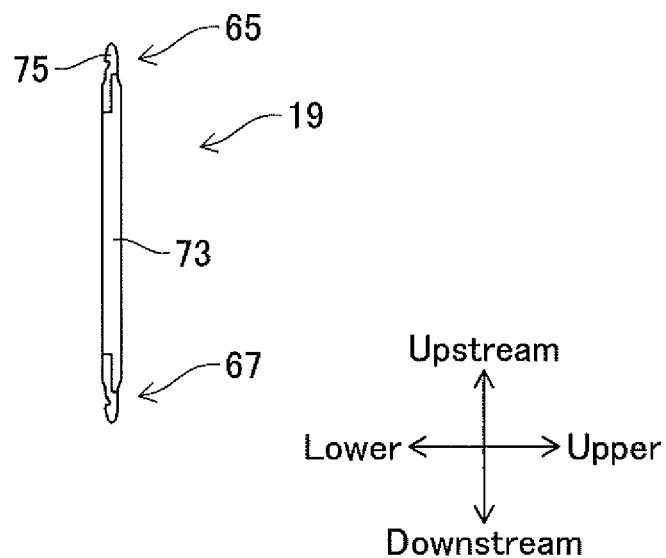
FIG. 21 is a sectional view illustrating a section taken along a line D-D of FIG. 11 (a position without protrusion parts)
Figure 22:
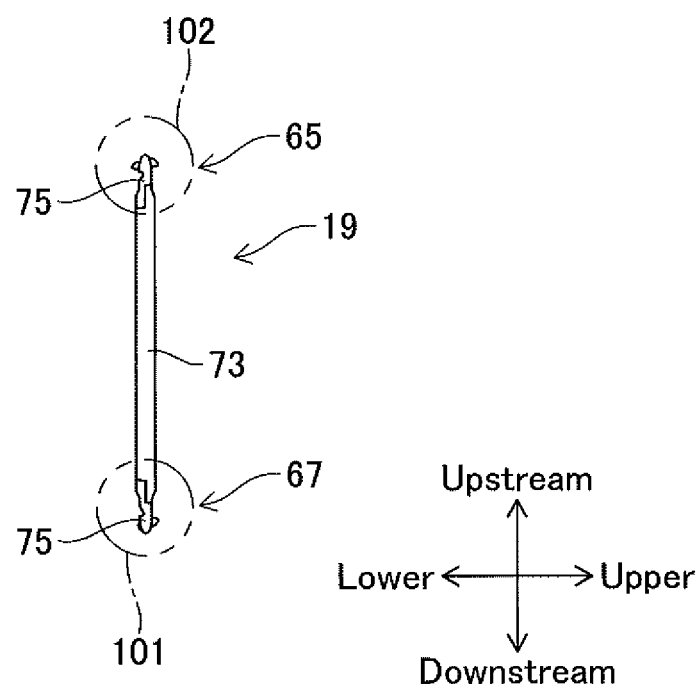
FIG. 22 is a sectional view illustrating a section taken along a line E-E of FIG. 11 (a position with protrusion parts)

As illustrated in FIGS. 19, 20, and 23, a protrusion amount of the lower side protrusion part 84 on the downstream side is smaller than a protrusion amount of the upper side protrusion part 83. The lower side protrusion part 84 has a substantially square shape when the damper 19 is viewed from top. As illustrated in FIG. 17, in the outer peripheral part of the upper surface 69, a protrusion part 88 having protrusion amounts smaller than those of the upper side protrusion parts 83, 85 is formed in parts other than parts where the upper side protrusion parts 83, 85 are formed (a corner, the left side outer periphery 77, and the right side outer periphery 79). Likewise, as illustrated in FIG. 19, the protrusion part 88 having protrusion amounts smaller than that of the lower side protrusion part 86 is formed in parts other than parts where the lower side protrusion parts 84, 86 are formed (the corner, the left side outer periphery 77, and the right side outer periphery 79). The protrusion part 88 has the same shape as the lower side protrusion part 84 provided on the lower surface 71 of the outer periphery on the downstream side 67.

As illustrated in FIGS. 17 and 18, an upper side plane part 93 is formed between the adjacent two upper side protrusion parts 83. A side surface 83A of the upper side protrusion part 83 in the lateral direction is formed into a plane along the vertical direction and the ventilating direction 22. Both sides of the upper side plane part 93 in the lateral direction are interposed by the two side surfaces 83A. The upper side plane part 93 is formed along the ventilating direction 22. An end part of the upper side plane part 93 on the downstream side is connected to an end part of the inclined surface 91A of the tip part on the downstream side 91 on the upstream side. Also, a plane part 83B parallel to the upper side plane part 93 is formed between an end part of the upper protrusion part 83 on the downstream side and an end part of the inclined surface 91A on the upstream side.

As illustrated in FIGS. 19 and 20, a lower side plane part 95 is formed between the adjacent two lower side protrusion parts 84. The lower side protrusion part 84 is formed into a curved and swollen shape. Both sides of the lower side plane part 95 in the lateral direction are interposed by two curved outer peripheral parts of the lower side protrusion parts 84. The lower side plane part 95 is formed along the ventilating direction 22. An end part of the lower side plane part 95 on the downstream side is connected to the end part of the inclined surface 91A of the tip part on the downstream side 91 on the upstream side. Also, an end part of the lower side protrusion part 84 on the downstream side is arranged at a position close to the end part of the inclined surface 91A on the upstream side.

As illustrated in FIGS. 20 and 23, a recessed part 97 is formed on the upstream side of the lower side protrusion part 84. The recessed part 97 is recessed in a direction orthogonal to the plane of the plate member 73 (upper side in FIG. 23). The recessed part 97 is formed along the lateral direction on the upstream side of the lower side protrusion part 84. Thickness of the soft seal member 75 in the outer periphery on the downstream side 67 is thin at a part where the recessed part 97 is formed. The recessed part 97 is formed so that the thickness of the soft seal member 75 is thin, thereby suppressing an elastic force when an elastically contacted state of the soft seal member 75 in the outer periphery on the downstream side 67 and the upper side wall 43 of the retainer 11 is elastically returned to the original state. That is, the elastic force of the soft seal member 75 when a closed state of the damper 19 is shifted to an opened state thereof can be suppressed. Thus, generation production of the abnormal noise which the soft seal member 75 occur produces when returning by elastic force can be suppressed.

Likewise, a recessed part 99 is formed on the downstream side of the lower side protrusion part 86 of the outer periphery on the upstream side 65 (see FIG. 24). The recessed part 99 is formed along the lateral direction. The thickness of the soft seal member 75 in the outer periphery on the upstream side 65 is thin at a part where the recessed part 99 is formed. Thus, an elastic force when an elastically contacted state of the soft seal member 75 in the outer periphery on the upstream side 65 and the lower side wall 44 of the retainer 11 is elastically returned to the original state is suppressed, thereby suppressing generation of the abnormal noise.

6. Structure of a Rib

Figure 10:
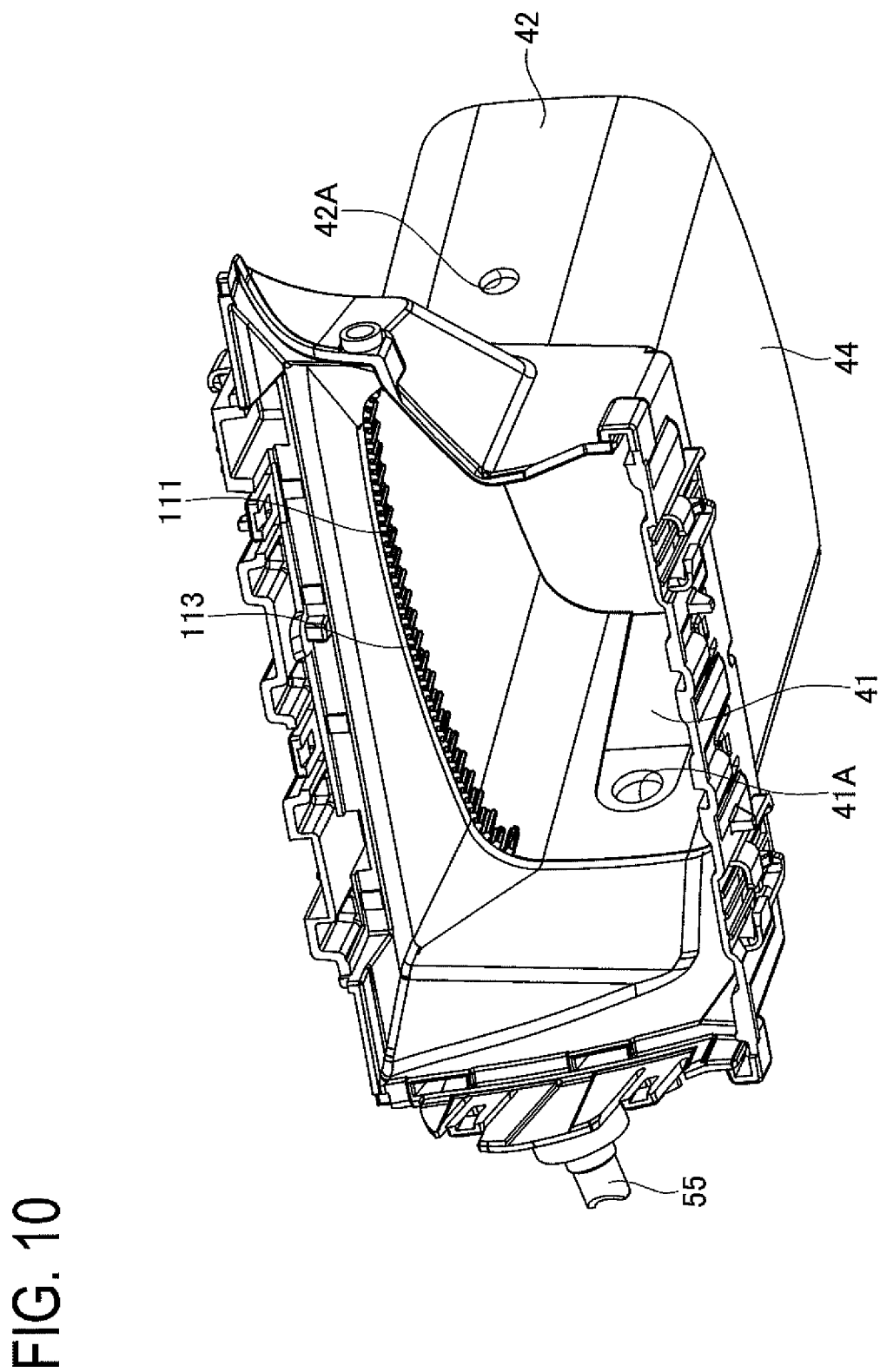
FIG. 10 is a perspective view of the retainer seen from the right front side and the lower side.
Figure 25:
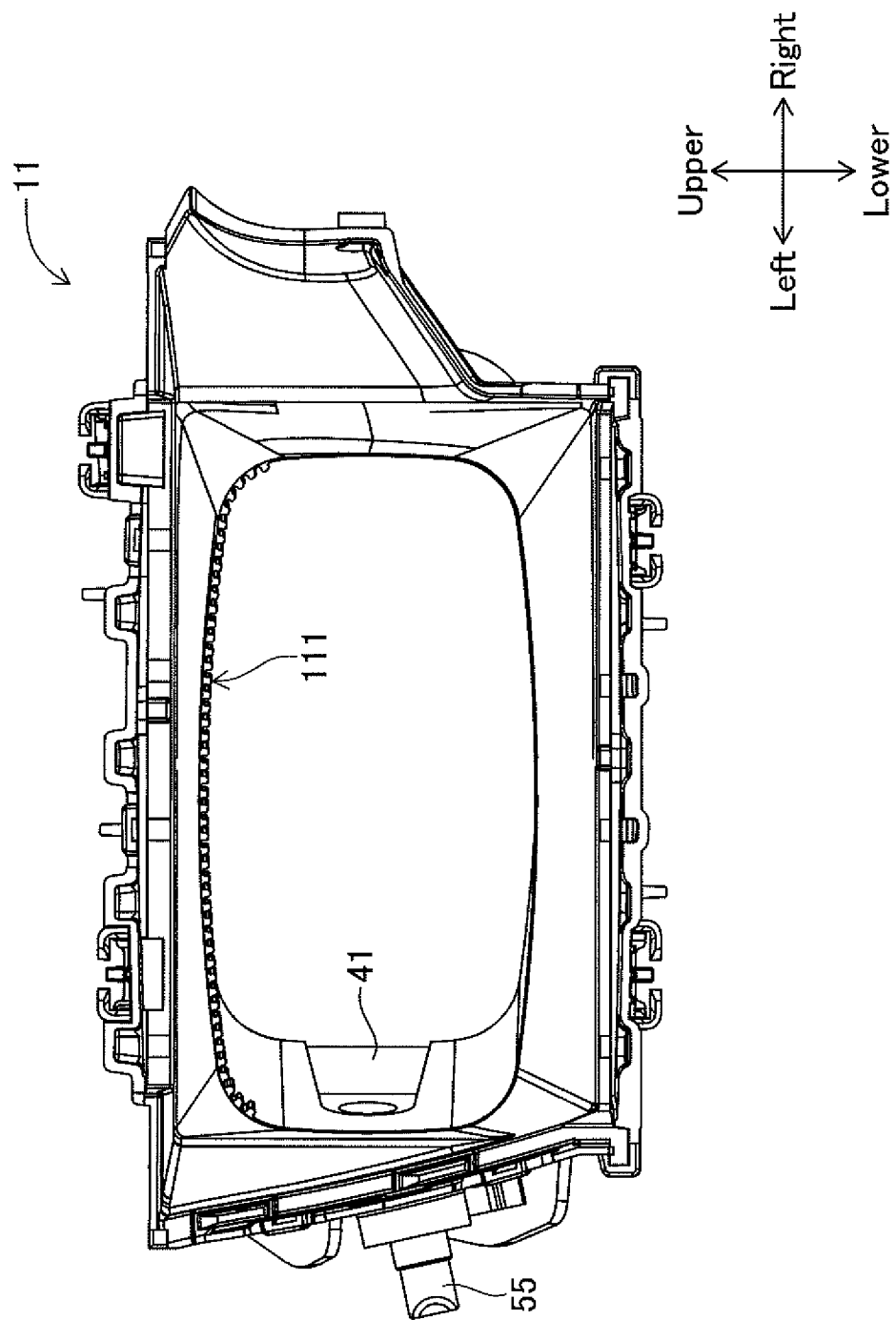
FIG. 25 is a front view of the retainer.
Figure 28:
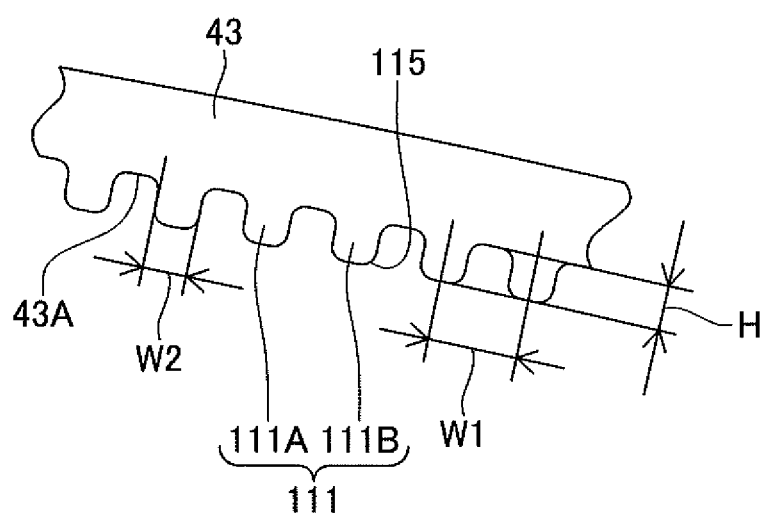
FIG. 28 is an enlarged view of an enlarged area 103 illustrated in FIG. 27.

Next, rib parts 111 provided in an inner wall 43A of the upper side wall 43 of the retainer 11 will be described with reference to FIGS. 25-28. FIG. 28 is an enlarged view of an enlarged area 103 illustrated in FIG. 27. As illustrated in FIGS. 25-28, the plurality of ribs 111 are formed in the inner wall 43A of the upper side wall 43 of the retainer 11. Each of the plurality of rib parts 111 is arranged along the lateral direction with the damper 19 in a neutral state as a reference, i.e. a direction parallel to a rotation axis of the damper 19. Each of the plurality of rib parts 111 is formed at an interval W1 with a prescribed space therebetween (see FIG. 28). The interval W1 is, for example, several millimeters. As illustrated in FIGS. 10 and 25, the retainer 11 is expanded outside so as to expand the ventilation flue 21 at position on the downstream side relative to the plurality of rib parts 111. In other words, each of the plurality of rib parts 111 is formed at a position close to a part where the ventilation flue 21 of the retainer 11 is expanded. The retainer 11 according to the present embodiment expand the ventilation flue 21 by expanding the left side wall 41, the upper side wall 43, and the lower side wall 44 outside at the position on the downstream side relative to the plurality of rib parts 111. A boundary between a part where the expansion of the ventilation flue 21 starts, i.e. a part formed with substantially the same inner diameter and an expanded part serves as a parting line PL of a position where a plurality of molds aligned when the retainer 11 is formed. Accordingly, the plurality of rib parts 111 is formed at a position close to the PL and a position on the upstream side of the PL.

Figure 26:
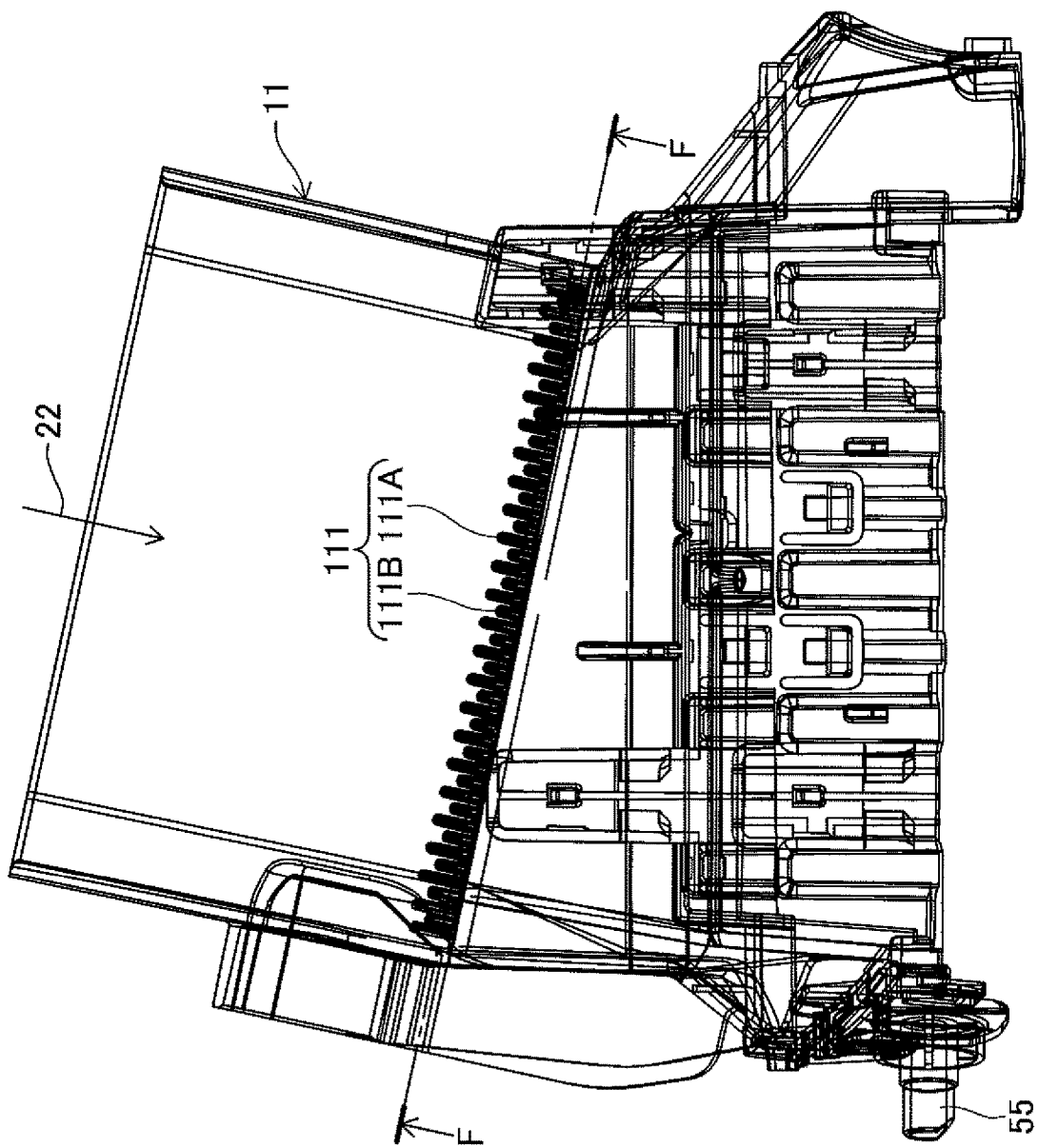
FIG. 26 is a top view of the retainer, which transparently illustrates an inside of the retainer.
Figure 27:
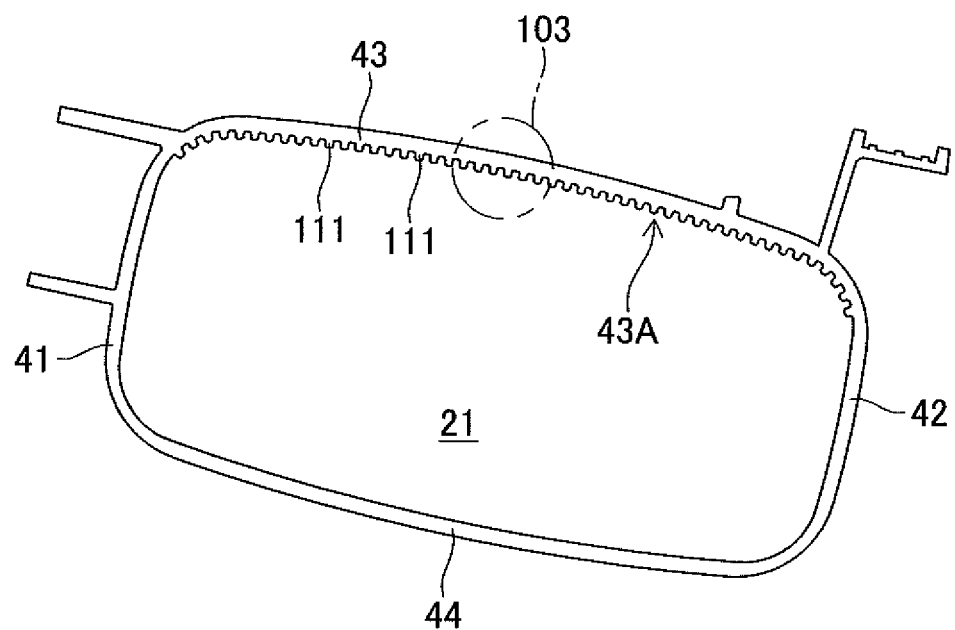
FIG. 27 is a sectional view illustrating a section taken along a line F-F of FIG. 26.

Each of the plurality of rib parts 111 is formed into a bar-like shape extending along the ventilating direction 22, i.e. a bar-like shape extending parallel to the plane of the damper 19 in the neutral state and along a direction orthogonal to the rotation axis of the damper 19. As illustrated in FIG. 26, the two adjacent rib parts 111 have each different length along the ventilating direction 22. When the two adjacent rib parts 111 are distinguished from each other in the below description, the rib parts are respectively referred to as a first rib part 111A and a second rib part 111B. As illustrated in FIG. 28, the first and second rib parts 111A and 111B have the same width W2 along the lateral direction. In addition, the first and second rib parts 111A and 111B have the same height H in the height direction orthogonal to the inner wall 43A.

Figure 7:
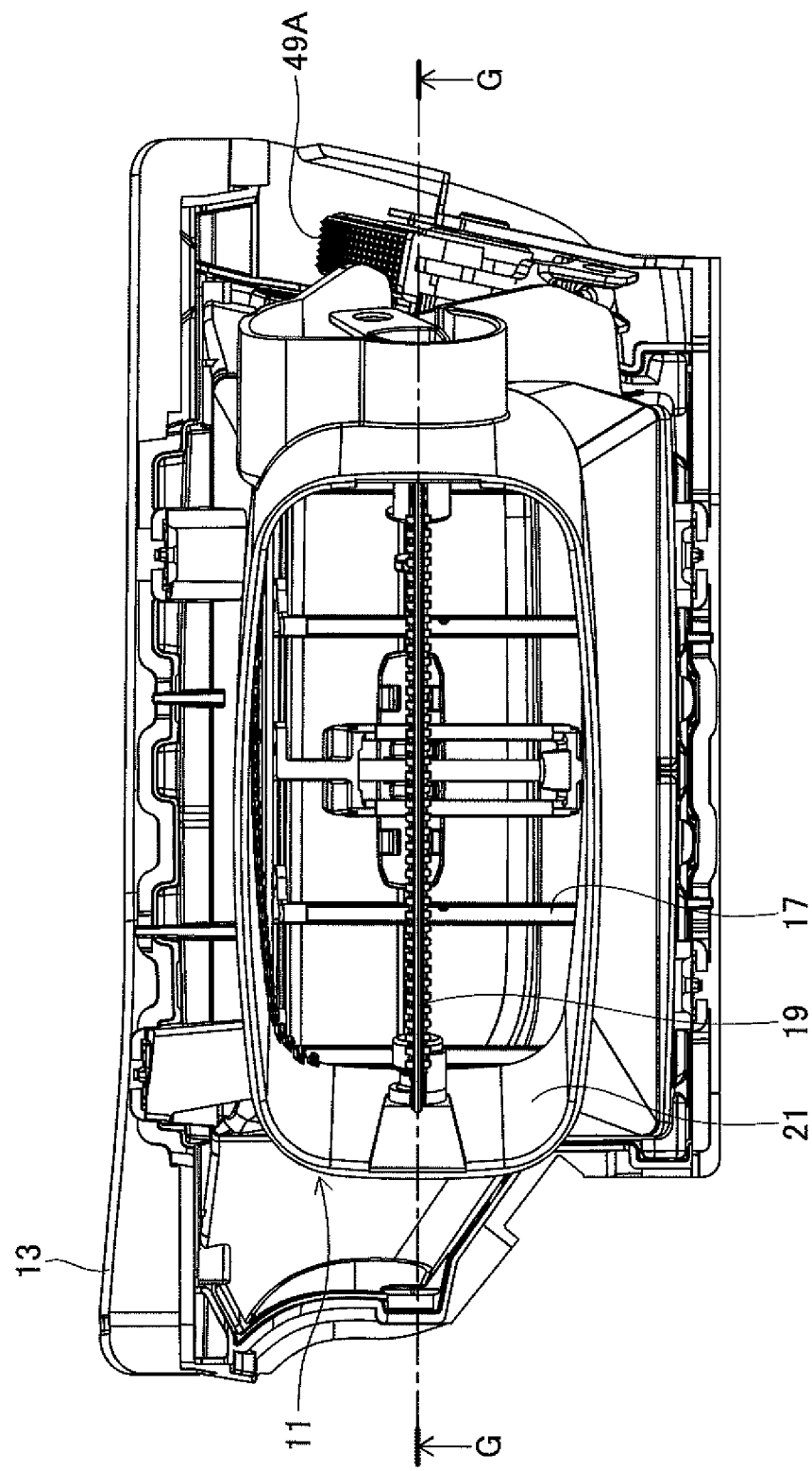
FIG. 7 is a rear view of the register.
Figure 29:
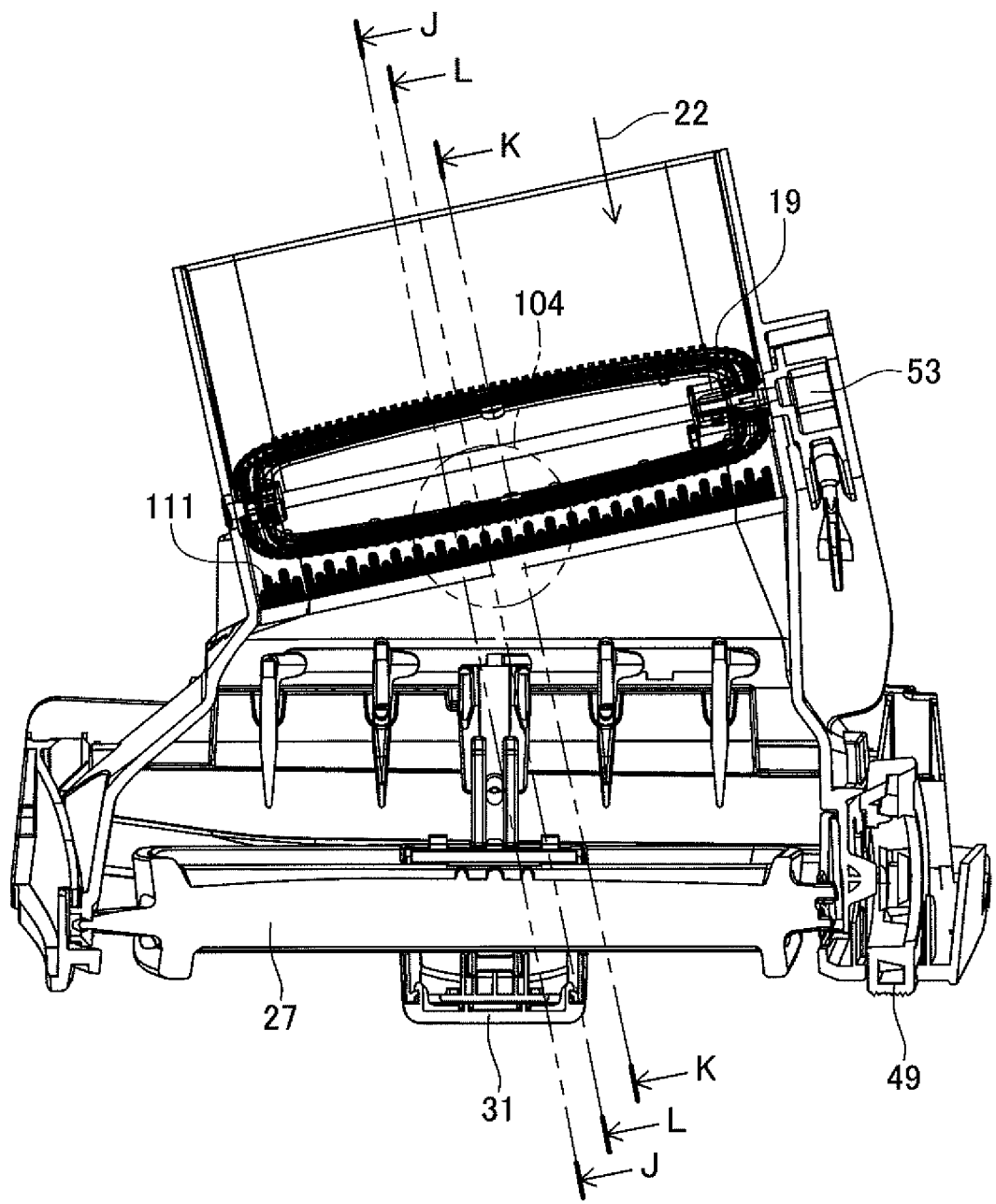
FIG. 29 is a sectional view illustrating a section taken along a line G-G of FIG. 7, which transparently illustrates the damper by turning the damper from a position in FIG. 7 to a position close to a rib part.
Figure 30:
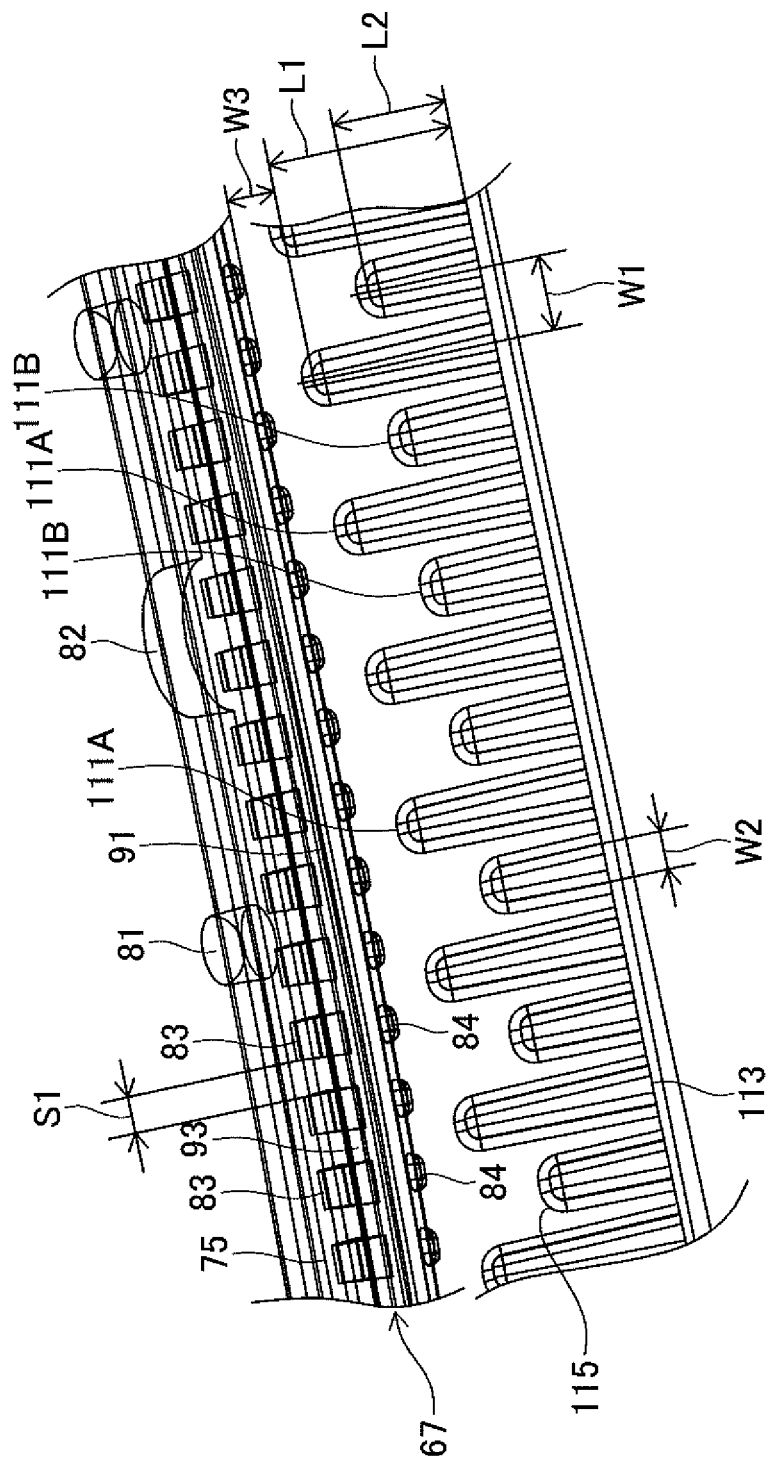
FIG. 30 is an enlarged view of an enlarged area 104 illustrated in FIG. 29.

FIG. 29 is a sectional view illustrating a section taken along a line G-G of FIG. 7, where the damper 19 is turned from a position in FIG. 7 to a position close to the rib parts 111. Accordingly, the damper 19 illustrated in FIG. 29 is in a state of turning to the position close to the rib parts 111 from the neutral state. FIG. 29 transparently illustrates the damper 19. FIG. 30 is an enlarged view of an enlarged area 104 illustrated in FIG. 29. As illustrated in FIGS. 29 and 30, each of the plurality of rib parts 111 are formed at a position on the downstream side relative to a position of the rotation axis of the damper 19. A length L1 along the ventilating direction 22 of the first rib part 111A is longer than a length L2 along the ventilating direction 22 of the second rib part 111B. In other words, the plurality of rib parts 111 are configured by alternately arranging the first and second rib parts 111A, 111B having different lengths. Also, the first and second rib parts 111A, 111B are alternately arranged along the direction parallel to the rotation axis of the damper 19. The plurality of rib parts 111 have a relationship parallel to the plane of the damper 19 in the neutral state.

As illustrated in FIG. 10, each of the plurality of rib parts 111 are formed with a flat surface 113 on the downstream side. For example, the flat surface 113 is formed by a divided surface of the mold in the PL and forms a plane orthogonal to the ventilating direction 22. As illustrated in FIGS. 28 and 30, each of the plurality of rib parts 111 has a corner part 115 in the lateral direction and the corner part 115 on the upstream side formed into an R-shape to be curved. For example, the corner part 115 of the first rib part 111A provided at a position facing the adjacent second rib part 111B and formed along the ventilating direction 22 is formed into a shape curved at a prescribed angle with respect to the vertical direction. Also, the corner part 115 of the rib parts 111 on the upstream side facing the damper 19 is formed into a shape curved at a prescribed angle. FIG. 30 illustrates an auxiliary line indicating a curved surface.

As illustrated in FIG. 30, each of the plurality of rib parts 111 is formed at a position facing a space S1 provided between the plurality of upper side protrusion parts 83 in the ventilating direction 22. More specifically, as described above, the upper side plane part 93 is formed between the two upper side protrusion parts 83. In other words, the two upper side protrusion parts 83 are arranged with the space S1 corresponding to a width of the upper side plane part 93 therebetween. For example, a positional relationship between the upper side protrusion part 83 of the damper 19 and the rib part 111 of the retainer 11 illustrated in FIG. 30 is a positional relationship in which an upstream end of the rib part 111 faces the upper side plane part 93 in the ventilating direction 22. That is, the rib part 111 and the upper side protrusion part 83 are arranged at a position shifted from each other in the lateral direction (the direction parallel to the rotation axis of the damper 19).

Figure 36:
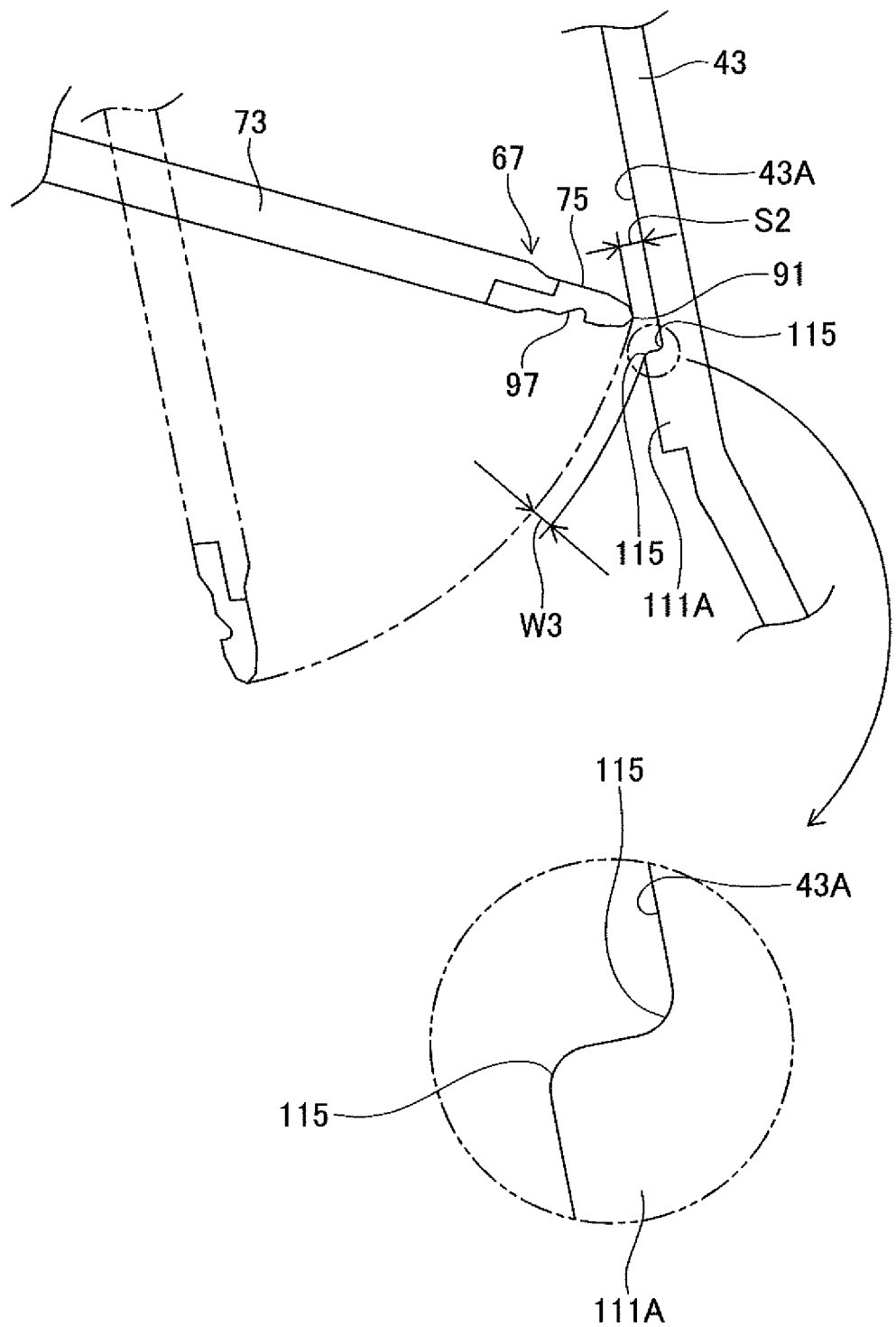
FIG. 36 is an enlarged view of an enlarged area 106 illustrated in FIG. 35.

A positional relationship between the upper side protrusion part 83 and the rib part 111 illustrated in FIG. 30 is an adjacent positional relationship in which the corner 115 on the upstream side and the lower side of the rib part 111 faces the tip part on the downstream side 91 of the damper 19 in the ventilating direction 22 (see FIG. 36). When the damper 19 is turned to a position where the outer periphery on the downstream side 67 and the plurality of rib parts 111 illustrated in FIG. 30 are faced with each other, the tip part on the downstream side 91 provided in the outer periphery on the downstream side 67 is arranged close to the plurality of rib parts 111. For example, the lower side protrusion part 84 is arranged at a position closer to an upstream end of the first rib part 111A by a distance W3. The distance W3 is, for example, 0.1 millimeter to several millimeters.

Figure 31:
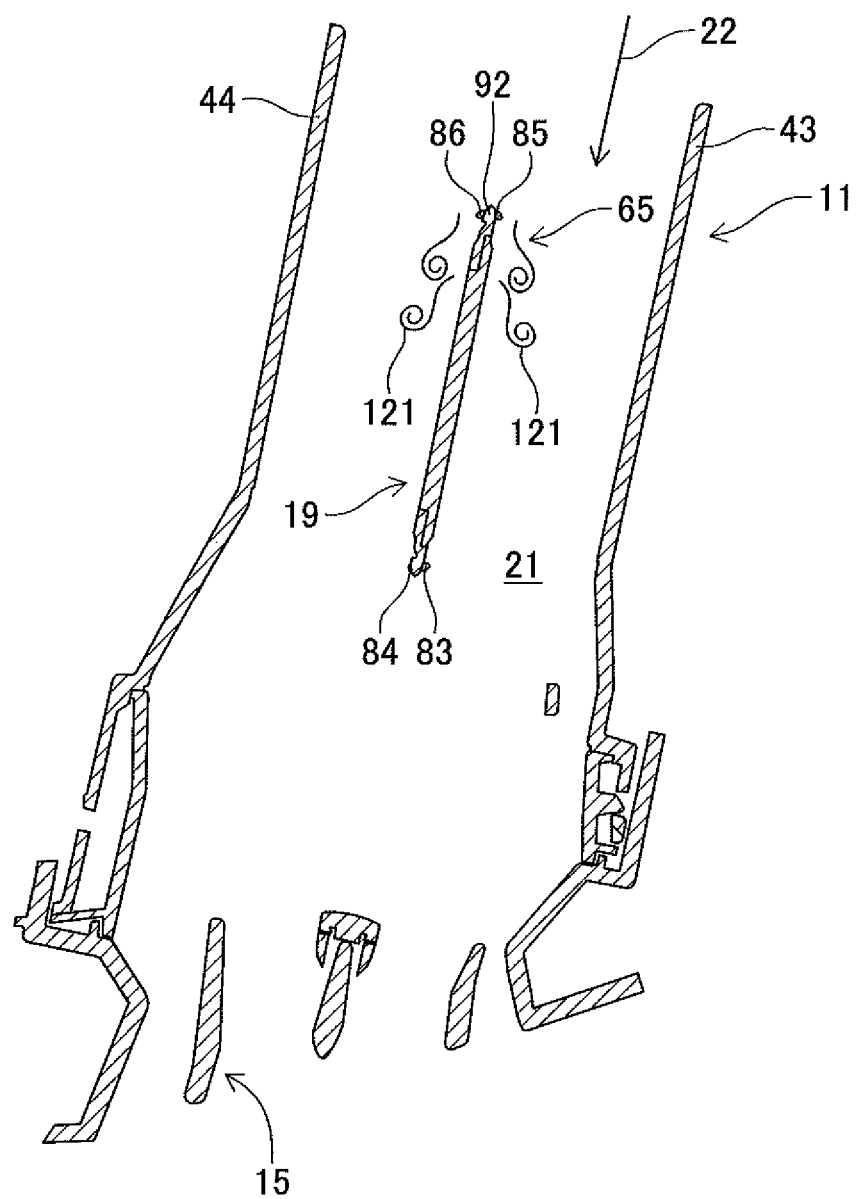
FIG. 31 is a sectional view illustrating a section taken along a line H-H of FIG. 6, which illustrates a state where the damper is in a neutral state to open a ventilation flue.

7. The Abnormal Noise in the Register in a State where the Ventilation Flue is Opened The damper 19 according to the present embodiment opens and closes the ventilation flue 21 by turned inside the retainer 11 to change an air blowing amount of the air conditioning air blowing in the ventilating direction 22. As illustrated in FIG. 31, the damper 19 is in a state along the ventilating direction 22 in the neutral state of the damper 19, i.e. a state where the ventilation flue 21 is fully opened. The air conditioning air blown from the upstream side hits the tip part on the upstream side 92 of the damper 19 and is flown after divided into the upper side wall 43 side and the lower side wall 44 side. The air conditioning air hits the tip part on the upstream side 92 and is divided, generating vortex flows 121 shown by vortex filaments in FIG. 31.

For example, when the small vortex flows 121 are generated in the similar form by a constant air volume, the abnormal noise such as a wind noise is more likely to be generated. Also, the abnormal noises such as a reflection sound reflected inside the retainer 11 and a resonated sound are more likely to be generated due to the wind noise. In contrast, the abnormal noises such as the wind noise and the reflection sound can be suppressed by disturbing a generation state of the vortex flows 121 so as not to generate the small vortex flows 121 in a constant form. In the damper 19 according to the present embodiment, the upper side protrusion part 85 and the lower side protrusion part 86 are provided in the outer periphery on the upstream side 65. The upper side protrusion parts 85 protrude upward and are arranged with a fixed space. Likewise, the lower side protrusion parts 86 protrudes downward and are arranged with a fixed space. A part of the air conditioning air blown from the upstream side hits the upper side protrusion part 85 and the lower side protrusion part 86, and then a flow thereof is changed. The part of the air conditioning air blown from the upstream side is finely divided so as to pass between the upper side protrusion part 85 (the lower side protrusion part 86) and the upper side protrusion part 85 (the lower side protrusion part 86) and is flown in a direction along a side surface of the upper side protrusion part 85 etc. Thus, the vortex flows 121 generated around the outer periphery on the upstream side 65 become larger vortex flows, thereby disturbing a generation form. As a result, the abnormal noise that can be generated in the opened state of the ventilation flue 21, i.e. the neutral state of the damper 19 and a state where the damper 19 is turned by only a certain amount can be suppressed. In a result of a simulation actually conducted by the applicant, a noise level of the abnormal noise in the damper 19 formed with the upper side protrusion part 85 and the lower side protrusion part 86 is reduced in comparison with the damper 19 without the upper side protrusion part 85 and the lower side protrusion part 86.

8. Operation of the Damper Plate when the Ventilation Flue is Closed

Next, the operation of the damper 19 when the ventilation flue 21 is closed will be described. When the ventilation flue 21 is closed, the damper 19 is turned to a position shown in FIG. 32 in response to the turning operation of the knob member 49 (see FIG. 4) of the opening and closing operation part 47. For example, the outer periphery on the upstream side 65 turns in a direction close to the lower side wall 44 of the retainer 11 following the turning of the damper 19. The outer periphery on the upstream side 65 makes the tip of the tip part on the upstream side 92 and the inclined surface 92A (see FIG. 24) on the lower surface 71 side brought into contact with the lower side wall 44. The outer periphery on the downstream side 67 turns in a direction close to the upper side wall 43. The outer periphery on the downstream side 67 makes the tip of the tip part on the downstream side 91 and the inclined surface 91A (see FIG. 23) on the upper surface 69 side brought into contact with the upper side wall 43. Thus, the ventilation flue 21 is closed by the damper 19.

The damper 19 according to the present embodiment includes the recessed part 99 and the recessed part 97 in the outer periphery on the upstream side 65 and outer periphery on the downstream side 67, respectively (see FIGS. 23 and 24). The recessed part 99 is formed on the lower surface 71 side of the damper 91. Accordingly, the soft seal member 75 in the outer periphery on the upstream side 65 is elastically deformed in a direction of expanding an opening of the recessed part 99 when contacting the lower side wall 44. In addition, the recessed part 97 on the downstream side according to the present embodiment is formed on the lower surface 71 side of the damper 91 as in the case with the recessed part 99 on the upstream side. Accordingly, the soft seal member 75 in the outer periphery on the downstream side 67 is elastically deformed in a direction of closing an opening of the recessed part 97 when contacting the upper side wall 43. Thus, an elastic force when elastically returning to the original state from the elastically contacted state is suppressed, thereby suppressing generation of the abnormal noise. Also, only the tip of the tip part on the downstream side 91, the inclined surface 91A, the tip of the tip part on the upstream side 92, and the inclined surface 92A of the damper 19 are elastically brought into contact with the retainer 11. Thus, since a contact area of the retainer 11 and the soft seal member 75 can be reduced, thereby reducing the abnormal noise when the soft seal member 75 is elastically brought into contact with the retainer 11. The damper 19 may not include the two recessed parts 97 and 99 on the same surface side. For example, the damper 19 may include the recessed part 97 and the recessed part 99 on the upper surface 69 side and the lower surface 71 side, respectively, and the damper 19 may not include the recessed parts 97 and 99. Alternatively, the damper 19 may include the recessed part 97 on both of the upper surface 69 and the lower surface 71 in the outer periphery on the downstream side 67.

9. The Abnormal Noise when the Damper is Slightly Opened

Next, the abnormal noise in a state where the damper 19 is slightly opened will be described. For example, even though a user intends to close the damper 19 by turning the knob member 49 (see FIG. 4) in fact, the damper 19 may not turn to a closed position shown in FIG. 32. For example, when the user slightly opens the damper 19 to blow a small amount of the air conditioning air, the abnormal noise may be generated by flowing the air conditioning air between the damper 19 and the retainer 11.

Figure 32:
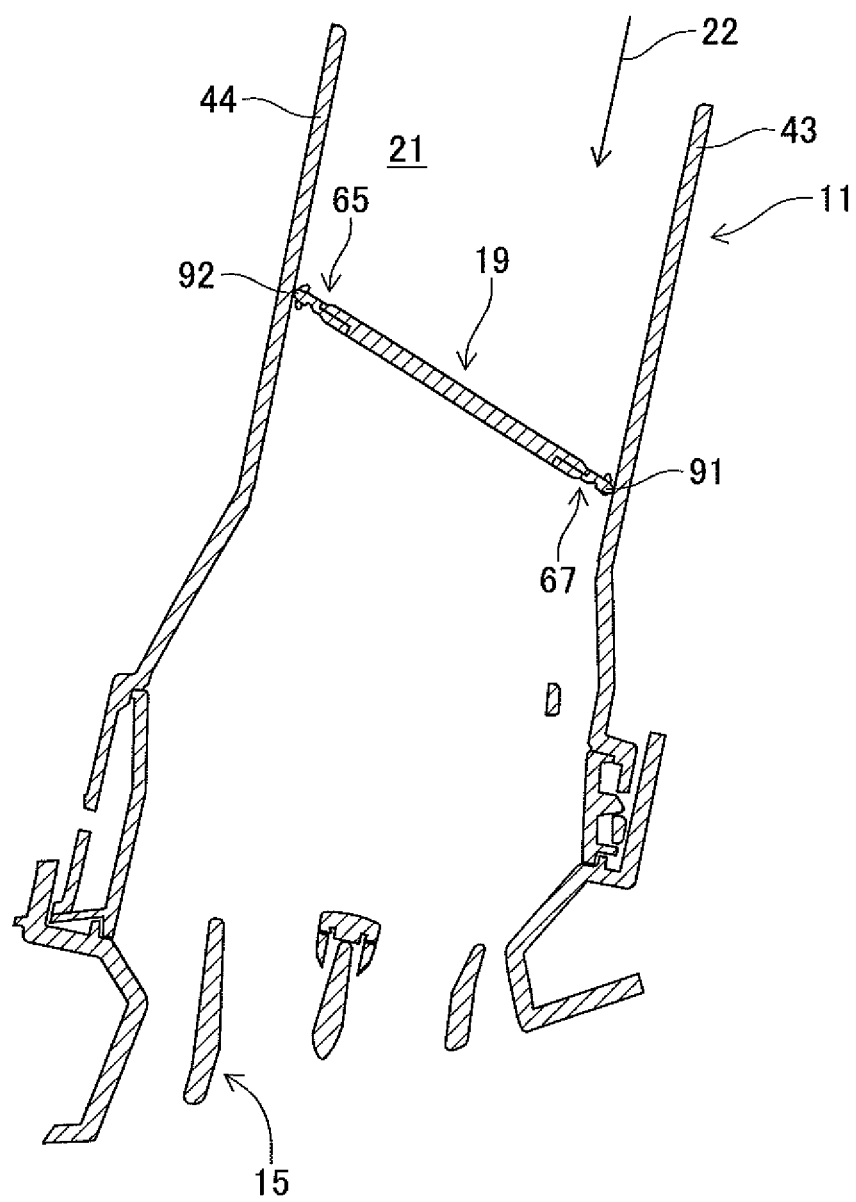
FIG. 32 is a view illustrating a state where the ventilating flue is closed by turning the damper of FIG. 31.
Figure 33:
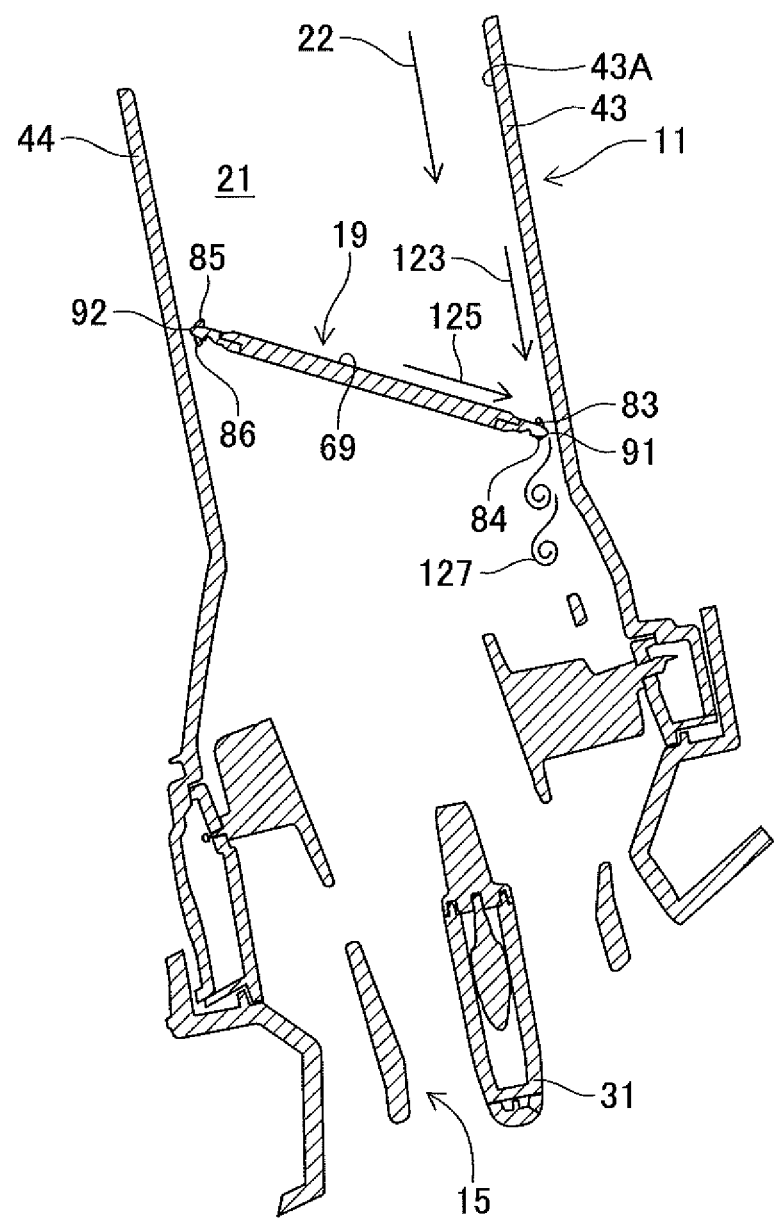
FIG. 33 is a sectional view illustrating a section taken along a line J-J of FIG. 29 (at a position of an upper side protrusion part 83)
Figure 34:
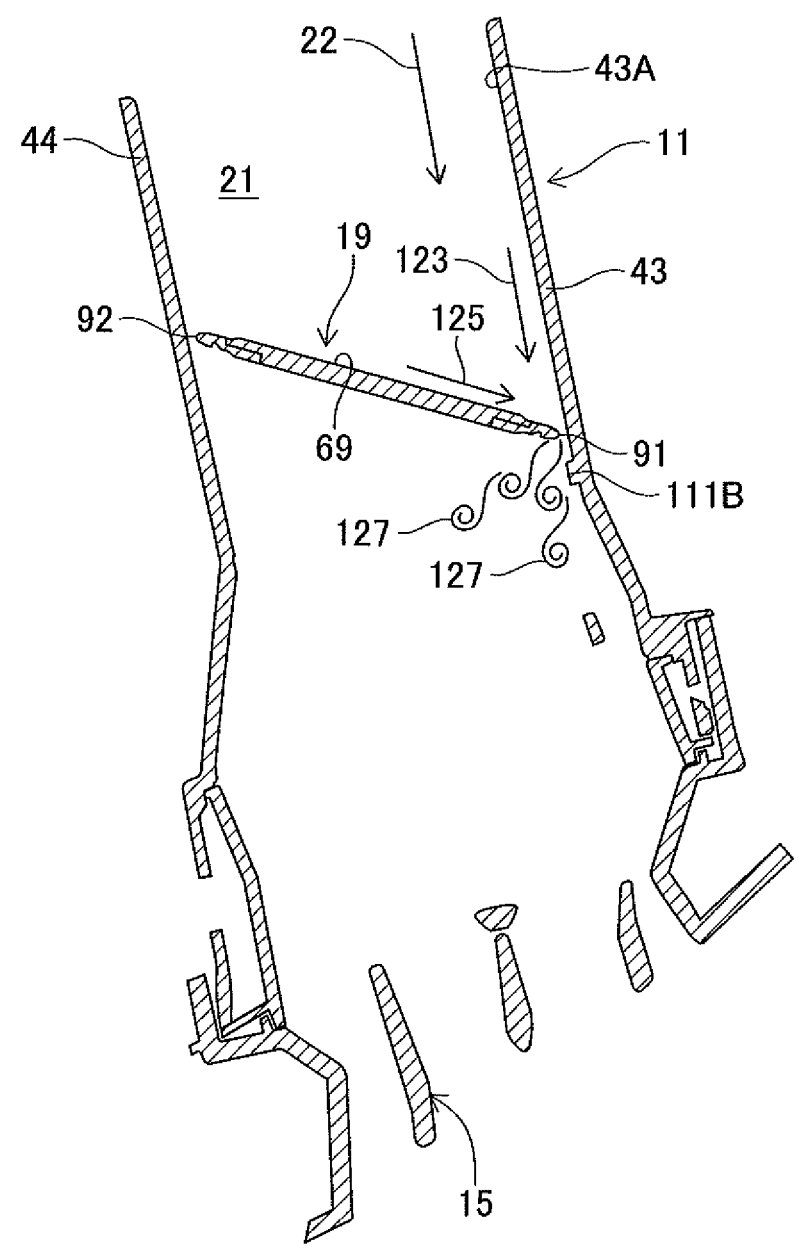
FIG. 34 is a sectional view illustrating a section taken along a line K-K of FIG. 29 (at a position of a second rib part 111B)
Figure 35:
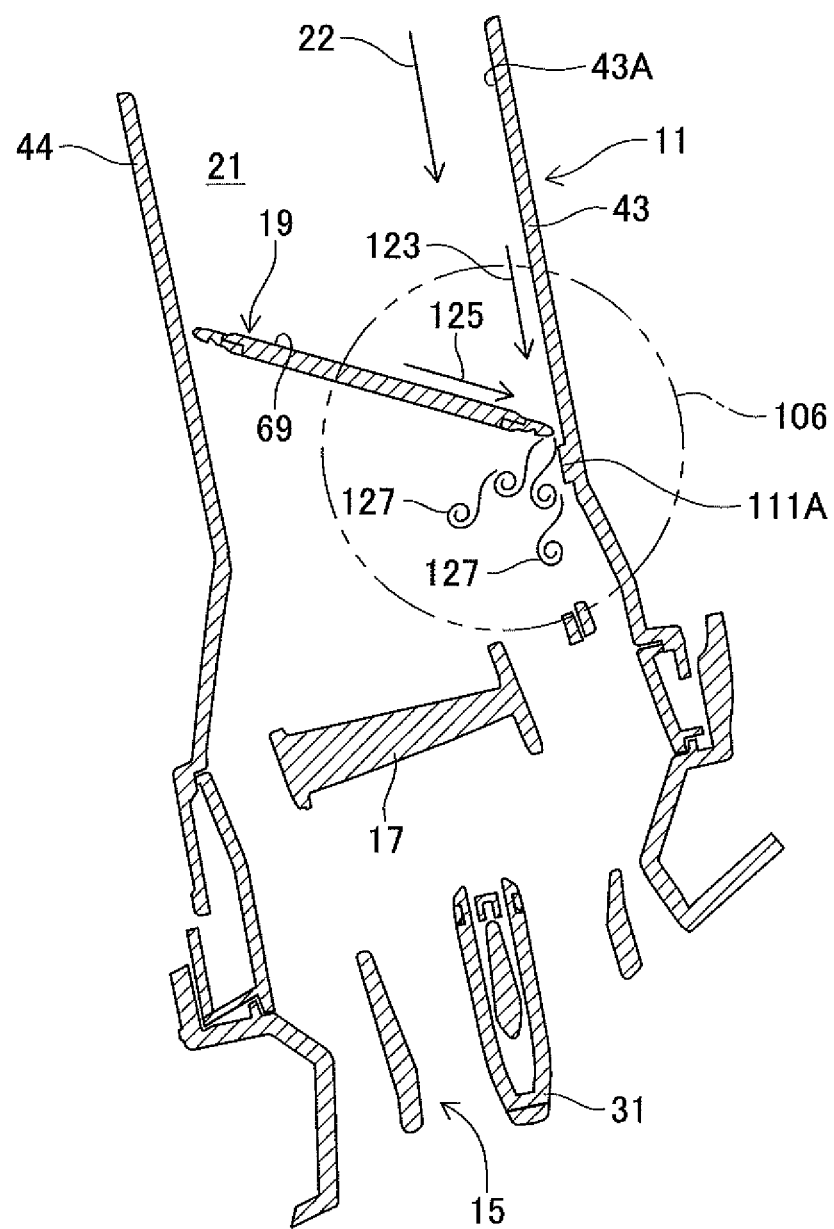
FIG. 35 is a sectional view illustrating a section taken along a line L-L of FIG. 29 (at a position of a first rib part 111A)

Specifically, FIGS. 33 to 36 show a state where the damper 19 is slightly opened from the closed position in FIG. 32. The upper side protrusion parts 83 and the rib parts 111 according to the present embodiment are arranged at a position shifted in the lateral direction as described above (see FIG. 30). Thus, while the upper side protrusion parts 83 and the lower side protrusion parts 84 are illustrated in the sectional view of FIG. 33, the rib part 111 shown in FIGS. 34 and 35 are not illustrated therein. In FIG. 36, a distance between the tip part on the downstream side 91 and the corner part 115 is illustrated as the distance W3 for convenience of explanation. The distance W3 between the tip part on the downstream side 91 and the corner part 115 in FIG. 36 is substantially the same as the distance W3 between the lower side protrusion part 84 and the first rib part 111A illustrated in FIG. 30. FIG. 36 is an enlarged view of an enlarged area 106 illustrated in FIG. 35. The damper 19 may be configured to arrange the upper side protrusion parts 83 and the rib parts 111 at the same position in the lateral direction (the position facing in the ventilating direction 22).

In states illustrated in FIGS. 33-36, the damper 19 slightly turns clockwise from the position shown in FIG. 32. In this state, the part of the air conditioning air blown from the upstream side is blown to the downstream side after passing through a space S2 (see FIG. 36) between the tip part on the downstream side 91 of the damper 19 and the inner wall 43A of the retainer 11. The part of the air conditioning air blown from the upstream side flows along the inner wall 43A of the retainer 11 as indicated by an arrow 123 of FIGS. 33-35. Also, the part of the air conditioning air blown from the upstream side flows along the upper surface 69 of the damper 19 as indicated by an arrow 125. That is, it is considered that the part of the air conditioning air blown from the upstream side is merged with each other passing through the space S2 between the tip part on the downstream side 91 and the inner wall 43A, thereby raising the wind velocity. Accordingly, the abnormal noise due to the air conditioning air passing through the space S2 between the tip part on the downstream side 91 and the inner wall 43A increases in comparison with the abnormal noise due to the air conditioning air passing through the space between the tip part on the upstream side 92 and the lower side wall 44. Therefore, it is important to suppress the abnormal noise due to the space S2 between the tip part on the downstream side 91 and the upper side wall 43.

The air conditioning air passing through the space S2 between the tip part on the downstream side 91 and the inner wall 43A generates vortex flows 127 shown by vortex filaments in FIGS. 33-35. Accordingly, the abnormal noise can be suppressed by disturbing a generation state of the vortex flows 127. The damper 19 according to the present embodiment is formed with the plurality of upper side protrusion parts 83 on the upper surface 69 in the outer periphery on the downstream side 67. Thus, the part of the air conditioning air flowing toward the space S2 such as the air conditioning air flowing toward the arrow 125 hits the upper side protrusion part 83 and then a flow thereof is changed. The part of the air conditioning air flowing toward the space S2 is finely divided so as to pass between the upper side protrusion parts 83, and is flown in a direction along the side surface 83A of the upper side protrusion part 83. Thus, the vortex flows 127 become larger, thereby disturbing a generation form of the vortex flows 127.

The retainer 11 according to the present embodiment includes the plurality of rib parts 111 on the inner wall 43A. As illustrated in FIGS. 32-36, the plurality of rib parts 111 are arranges on the downstream side relative to the position of the outer periphery on the downstream side 67 in a state where the damper 19 is in a closed state by being brought into contact with the upper side wall 43 and the lower side wall 44 of the retainer 11. The plurality of rib parts 111 are arranged at a position not brought into contact with the damper 19 in the turning operation of the damper 19. The adjacent first and second rib parts 111A, 111B have the different lengths L1, L2 along the ventilating direction 22 (see FIG. 30). Thus, an end part of the first rib part 111A on the upstream side and an end part of the second rib part 111B on the upstream side are provided at mutual different positions in the ventilating direction 22. Accordingly, the air conditioning air passing through the space S2 hits the end part of the rib part 111 on the upstream side provided at the different positions in the ventilating direction 22, and then the flow thereof is disturbed. Thus, the vortex flows 127 can become larger, thereby disturbing a generation form of the vortex flows 127. As a result, the abnormal noise due to the space S2 can be suppressed. In a result of the simulation actually conducted by the applicant, the noise level of the abnormal noise in the register 10 formed with the upper side protrusion parts 83 and the rib parts 111 is reduced in comparison with the register 10 without the upper side protrusion parts 83 and the rib parts 111. As described above, the register 10 according to the present embodiment can suppress the abnormal noise passing through the space S2 by the upper side protrusion part 83 and the rib part 111.

FIGS. 33-36 illustrate a state where the damper 19 is turned at a position where the outer periphery on the downstream side 67 faces the plurality of rib parts 111 as one example of the position where the space S2 is formed. As described above, in the damper 19 and the retainer 11 according to the present embodiment, the tip part on the downstream side 91 in the outer periphery on the downstream side 67 is arranged closer to the plurality of rib parts 111 by the distance W3. Thus, the rib parts 111 are arranged at a position not brought into contact with the damper 19 and at a position as close as possible to the damper 19, thereby greatly disturbing the vortex flows 127 and effectively suppressing the abnormal noise.

The relationship between words in the above embodiment and words in the claims is as follows:

The left side shaft part 61 and the right side shaft part 62 are one example of a shaft part. The upper surface 69 is one example of a surface on a side facing the plurality of rib parts 111. The upper side protrusion part 83 is one example of a protrusion part. The tip part on the downstream side 91 is one example of a tip part.

According to the above-mentioned first embodiment, the following effects are brought out.

(1) The register 10 comprises: the retainer 11 having the cylindrical shape and provided with the ventilation flue 21 that allows to blow air in the ventilating direction 22; and the damper 19 provided inside the retainer 11 and turnably supported by the retainer 11 to open and close the ventilation flue 21 following turning of the damper 19. The damper 19 includes the plate member 73 formed into a flat plate shape, the shaft part (the left side shaft part 61, the right side shaft part 62) supporting the plate member 73 turnably around the turning axis with respect to the retainer 11; and the soft seal member 75 provided in the outer periphery of the plate member 73. The retainer 11 includes the inner wall 43A elastically brought into contact with the soft seal member 75 provided in the outer periphery on the downstream side 67, i.e. the outer periphery of the plate member 73 on the downstream side in the ventilating direction 22 in the closed state of the damper 19. The plurality of rib parts 111 provided on the downstream side relative to the outer periphery on the downstream side 67 are formed in the inner wall 43A in the closed state of the damper 19. The plurality of rib parts 111 are arranged in the direction parallel to the turning axis (the lateral direction with the damper 19 in the neutral state as a reference), and the adjacent ribs 111 are formed into different shapes. The soft seal member 75 includes the plurality of upper side protrusion parts 83 in the outer periphery on the downstream side 67 and on the upper surface 69 on the side facing the plurality of rib parts 111 when the damper 19 is arranged along the ventilating direction 22 (in the neutral state).

According to the above technical effects, the damper 19 is turnably supported inside the retainer 11, and the ventilation flue 21 of the retainer 11 is opened and closed following the turning of the damper 19. The damper 19 includes the soft seal member 75 in the outer periphery of the plate member 73 formed into the flat plate shape. In the closed state of the damper 19, the soft seal member 75 provided in the outer periphery on the downstream side 67 of the plate member 73 is brought into contact with the inner wall 43A of the retainer 11. The plurality of rib parts 111 are formed on the inner wall 43A. The plurality of rib parts 111 are provided on the downstream side relative to the outer periphery on the downstream side 67 in the closed state of the damper 19. The plurality of rib parts 111 are arranged in the lateral direction parallel to the turning axis of the plate member 73. The adjacent rib parts 111 are formed in the different shapes. Thus, the space S2 is formed between the outer periphery on the downstream side 67 of the damper 19 and the inner wall 43A of the retainer 11, and the air conditioning air flowing out from the space S2 hits the plurality of rib parts 111, thereby generating the vortex flows 127 when the air conditioning air flows passing through the space S2. The larger vortex flows 127 is generated by forming the adjacent rib parts 111 so as to have the different shapes in comparison with a case where the rib parts 111 are formed into the same shapes, and thus the abnormal noise (such as the wind noise and the sound resonated with the wind noise) can be suppressed more surely.

The soft seal member 75 includes the plurality of upper side protrusion parts 83 in the outer periphery on the downstream side 67 and on the upper surface 69 on the side facing the plurality of rib parts 111. Thus, the part of the air conditioning air flowing into the space S2 formed between the outer periphery on the downstream side 67 and the inner wall 43A flows so as to pass between and above the plurality of upper side protrusion parts 83, thereby disturbing the flow. The generation of the abnormal noise can be suppressed more surely by generating the larger vortex flows 127. That is, the abnormal noise can be effectively suppressed by the rib parts 111 and the upper side protrusion parts 83.

(2) The plurality of rib parts 111 includes the first rib part 111A and the second rib part 111B arranged adjacent to the first rib part 111A. The first rib part 111A has the height H (see FIG. 28) along the height direction orthogonal to the inner wall 43A and same as that of the second rib part 111B. The length L1 along the ventilating direction 22 is longer than the length L2 of the second rib part 111B (see FIG. 30). According to the above, the adjacent rib parts 111 are formed at the same height H and with the different lengths L1, L2. The flow of the air conditioning air flowing from the upstream side is disturbed at the different positions in the ventilating direction. As a result, the larger vortex flows 127 is generated, thereby suppressing the generation of the abnormal noise more surely.

(3) The first rib part 111A and the second rib part 111B are alternately arranged in the lateral direction parallel to the rotation axis of the damper 19. Thus, the larger vortex flows 127 are generated, thereby suppressing the generation of the abnormal noise more surely by alternately arranging the first rib part 111A and the second rib part 111B having the different shapes.

(4) The plurality of rib parts 111 are arranged at a position facing the space S1 provided between the plurality of upper side protrusion parts 83 in the ventilating direction 22 (see FIG. 30). Thus, the rib parts 111 and the upper side protrusion parts 83 are arranged at a position shifted from each other in the lateral direction parallel to the rotation axis of the damper 19. As a result, the larger vortex flows 127 are generated, thereby suppressing the generation of the abnormal noise more surely by shifting the positions of the rib parts 111 and the upper side protrusion parts 83.

(5) The plurality of rib parts 111 extends along the ventilating direction 22, and the corner part 115 on the upstream side in the ventilating direction 22 is formed into the R-shape. For example, as illustrated in the enlarged view of FIG. 36, the corner part 115 of the first rib part 111A on the upstream side is formed into the curved circular arc shape. Thus, the vortex flows 127 can be generated by flowing the air blown in the ventilating direction 22 along the R-shape.

(6) When the damper 19 is turned to a position where the outer periphery on the downstream side 67 and the plurality of rib parts 111 are faced with each other, the tip part on the downstream side 91 of the soft seal member 75 provided in the outer periphery on the downstream side 67 is arranged close to the plurality of rib parts 111 (see the distance W3 of FIGS. 30, 36). Thus, since the tip part on the downstream side 91 of the damper 19 is brought close to the plurality of rib parts 111, the larger vortex flows can be generated by the air conditioning air passing between the tip part on the downstream side 91 and the plurality of rib parts 111.

10. The Second Embodiment

Figure 37:
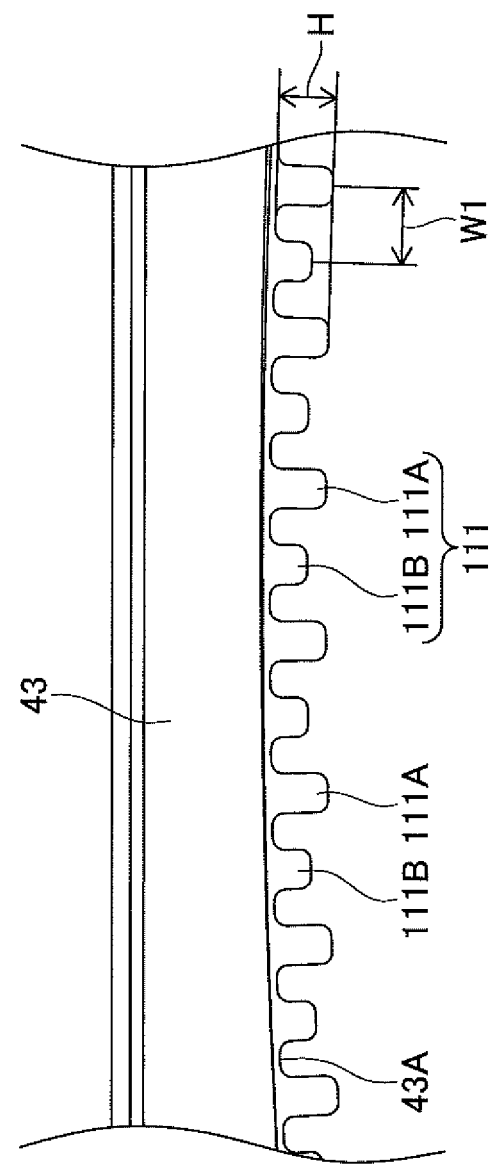
FIG. 37 is an enlarged view of a rib part according to the second embodiment.
Figure 38:
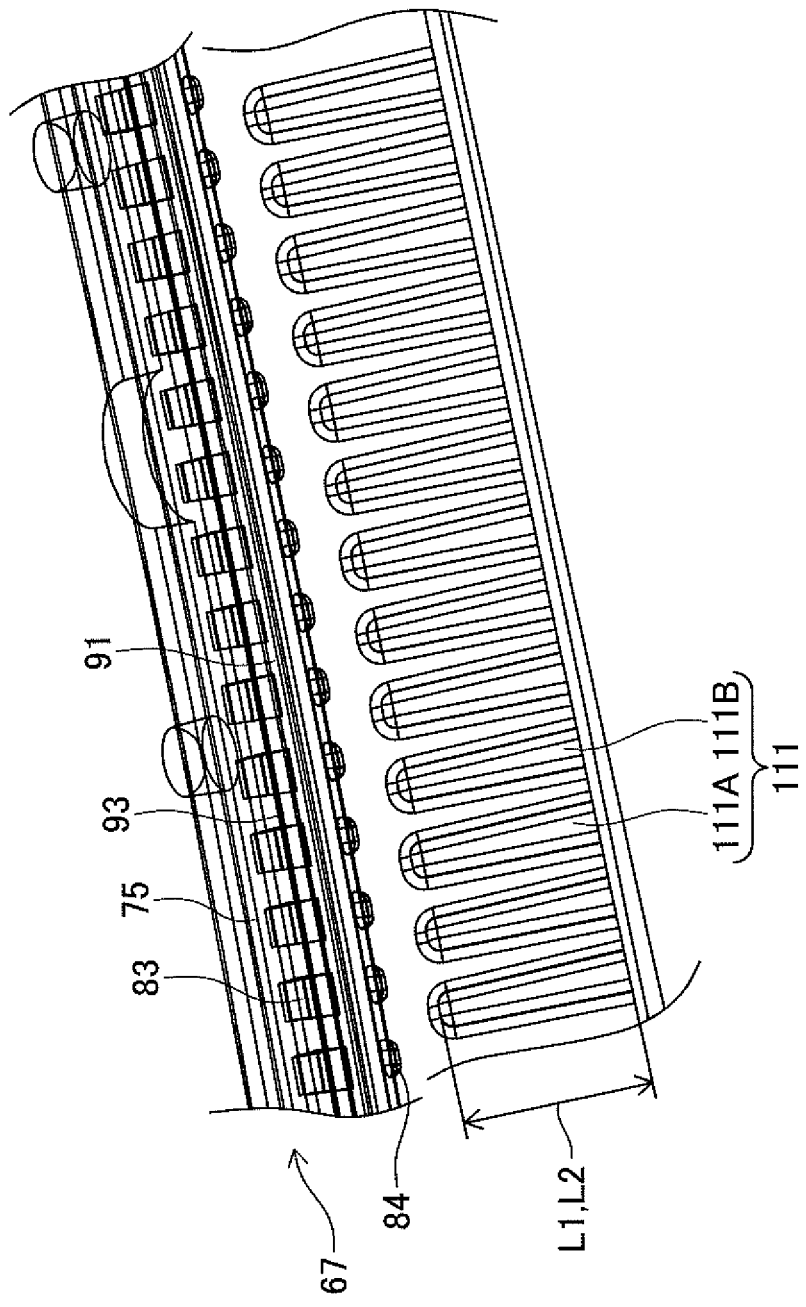
FIG. 38 is an enlarged view of the rib part and an outer periphery on the downstream side according to the second embodiment.

Next, the second embodiment of the present invention will be described with reference to FIGS. 37 and 38. In the below description, the same reference signs are used for the same structure as the first embodiment, and the explanation will be appropriately omitted. In the rib part 111 according to the first embodiment, the first rib part 111A has the height H along the height direction orthogonal to the inner wall 43A, the height same as that of the second rib part 111B (see FIG. 28). In contrast, as illustrated in FIG. 37, each of the first rib part 111A and the second rib part 111B may have the different heights H. For example, the height H of the first rib part 111A may be higher than that of the second rib part 111B.

In the first embodiment, the length L1 of the first rib part 111A along the ventilating direction 22 is longer than the length L2 of the second rib part 111B. In contrast, as illustrated in FIG. 38, the length L1 of the first rib part 111A according to the second embodiment is the same as the length L2 of the second rib part 111B. Accordingly, while the first and second rib parts 111A and 111B according to the second embodiment have the length L1 and the length L2 along the ventilating direction 22 with the same lengths, respectively, the heights H in the height direction are different from each other.

In the register 10 according to the second embodiment having the above structure, the same effects as the first embodiment are brought out. For example, the air conditioning air flowing from the upstream side is flown at different positions in the vertical direction by the first and second rib parts 111A and 111B having the different heights H. As a result, the larger vortex flows 127 can be generated, thereby suppressing the generation of the abnormal noise.

11. The Third Embodiment

Next, the third embodiment of the present invention will be described with reference to FIG. 39. In the first and second embodiments, the plurality of rib parts 111 have two kinds of rib parts 111 having the different shapes (the first and second rib parts 111A and 111B). In contrast, the plurality of rib parts 111 according to the third embodiment includes a third rib part 111C as well as the first rib part 111A and the second rib part 111B.

Figure 39:
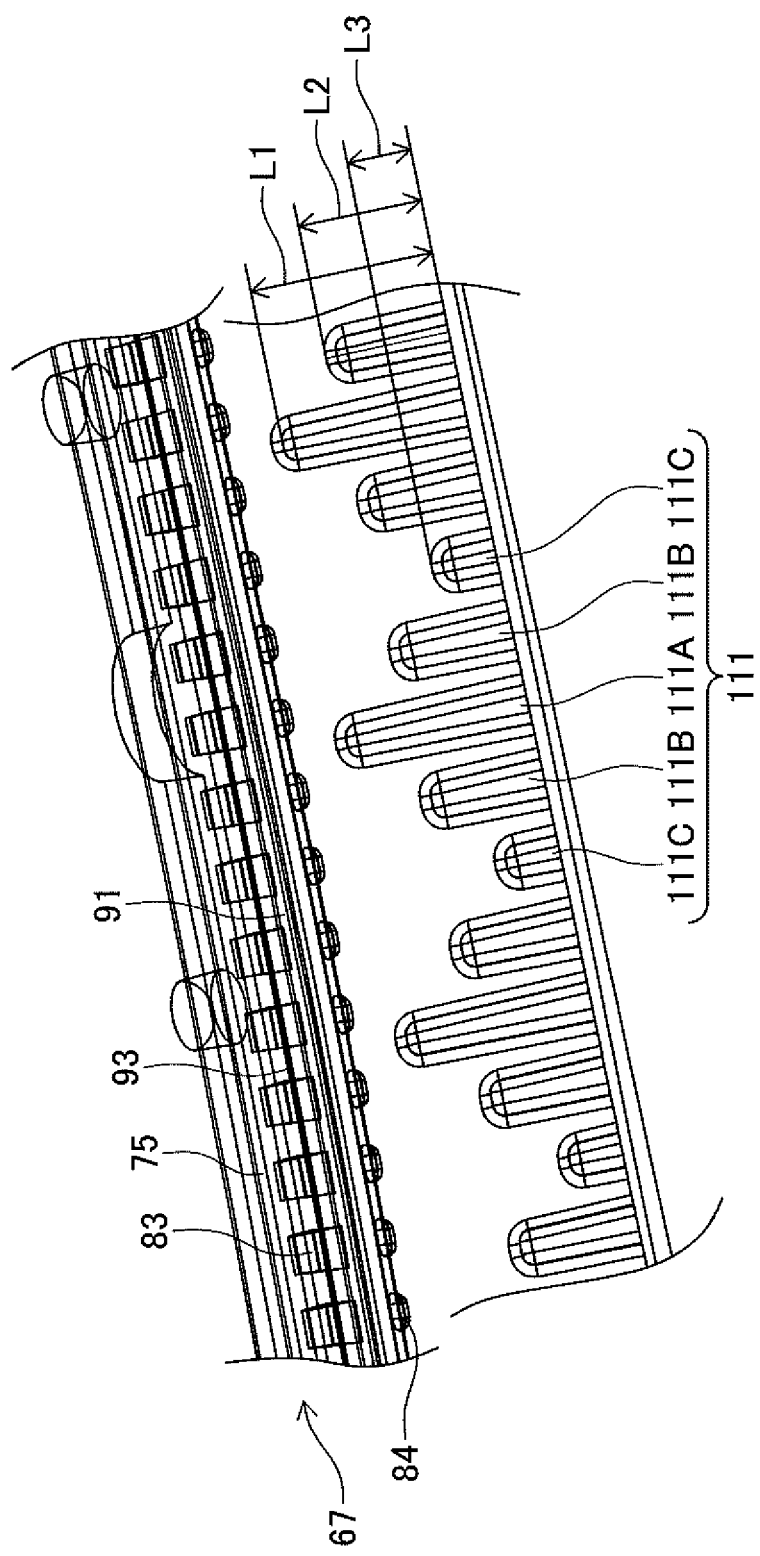
FIG. 39 is an enlarged view of a rib part and an outer periphery on the downstream side according to the third embodiment.

As illustrated in FIG. 39, the plurality of rib parts 111 include the first rib part 111A, the second rib part 111B, and the third rib part 111C. The pair of second rib parts 111B is formed on both sides of the first rib part 111A in the lateral direction. That is, the pair of second rib parts 111B is arranged with the first rib part 111A interposed therebetween. The pair of third rib parts 111C is arranged interposing the three rib parts, i.e. the first rib part 111A and the pair of second rib parts 111B interposing the first rib part 111A therebetween. The plurality of rib parts 111 are arranged in the following order: the third rib part 111C, the second rib 111B, the first rib part 111A, the second rib part 111B, the third rib part 111C, the second rib part 111B, the first rib part 111A, and the second rib part . . . . The length L2 of the second rib part 111B along the ventilating direction 22 is shorter than the length L1 of the first rib part 111A. A length L3 of the third rib part 111C along the ventilating direction 22 is shorter than the length L2 of the second rib part 111B.

In the register 10 according to the third embodiment having the above structure, the same effects as the first embodiment is brought out. For example, the flow of the air conditioning air flowing from the upstream side passing through the space S2 is disturbed at the three different positions in the ventilating direction 22 by arranging the three kinds of rib parts 111 having the different lengths L1, L2, and L3 (the first rib part 111A, the second rib part 111B, and the third rib part 111C). As a result, the larger vortex flows 127 is generated, thereby suppressing the generation of the abnormal noise. The first rib part 111A, the second rib part 111B, and the third rib part 111C according to the third embodiment (see FIG. 37) may have the same heights H, or the different heights H. For example, the three kinds of rib parts 111 may have the different height H. Alternatively, only the first rib part 111A and the second rib part 111B may have the same height H.

12. The Fourth Embodiment

Figure 40:
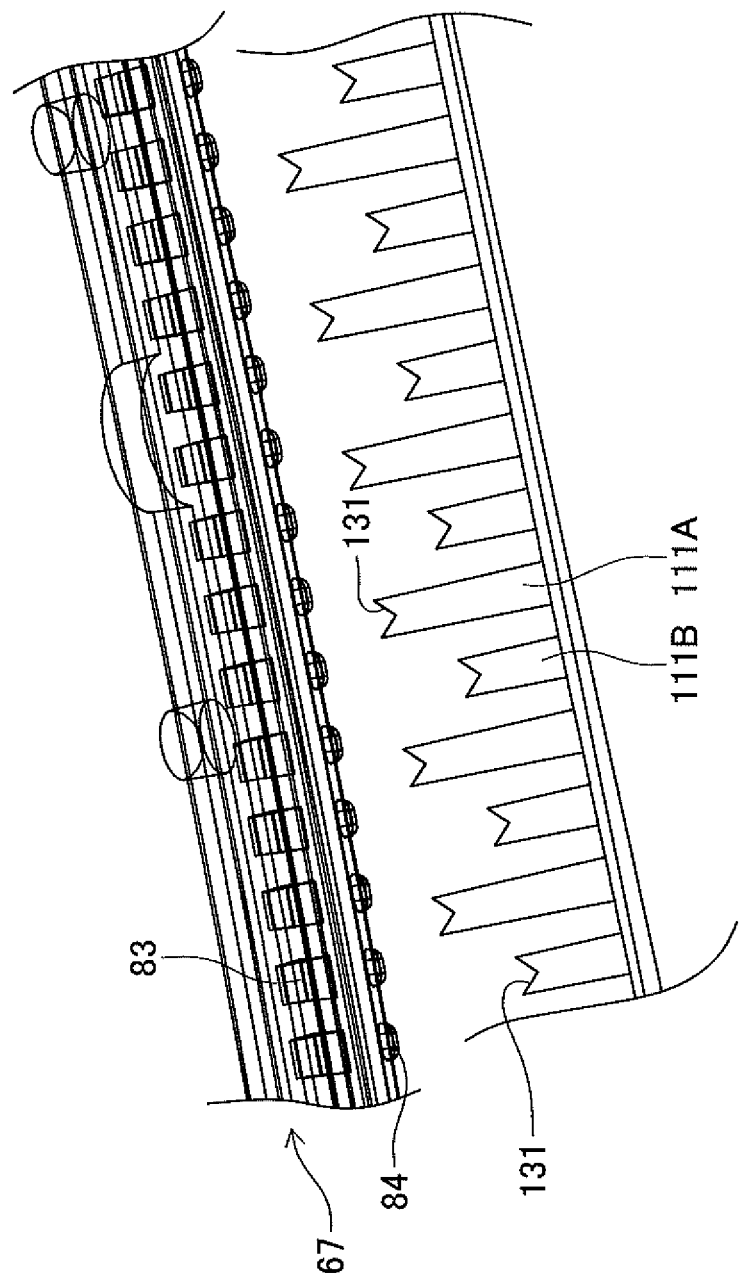
FIG. 40 is an enlarged view of a rib part and an outer periphery on the downstream side according to the fourth embodiment.

Although the rib parts 111 according to the first to third embodiments have the corner part 115 formed into the R-shape, the any other shape may be selected. For example, as illustrated in FIG. 40, a tip part 131 of the rib part 111 on the upstream side may be formed into a shape opened on the upstream side. As illustrated in FIG. 40, the tip part 131 of the rib part 111 is formed into a shape opened in V-shape when seen from one side in the vertical direction. A center of the tip part 131 in the lateral direction is defined as the vertex and is expanded and opened in the lateral direction from the downstream side toward the upstream side. The tip part 131 has a V-shaped groove cut out at an acute angle. An end of the tip part 131 on the upstream side is pointed into a triangular shape. In the rib parts 111 having the above shape, since the air conditioning air passing through the space S2 between the tip part on the downstream side 91 and the inner wall 43A is divided by the V-shaped tip part 131, the vortex flows are disturbed, thereby suppressing the abnormal noise. In the fourth embodiment illustrated in FIG. 40, the both of the first rib part 111A and the second rib part 111B are formed with the V-shaped tip part 131. In contrast, either one of the first rib part 111A and the second rib part 111B may be formed with the V-shaped tip part 131.

13. The Fifth Embodiment

Figure 41:
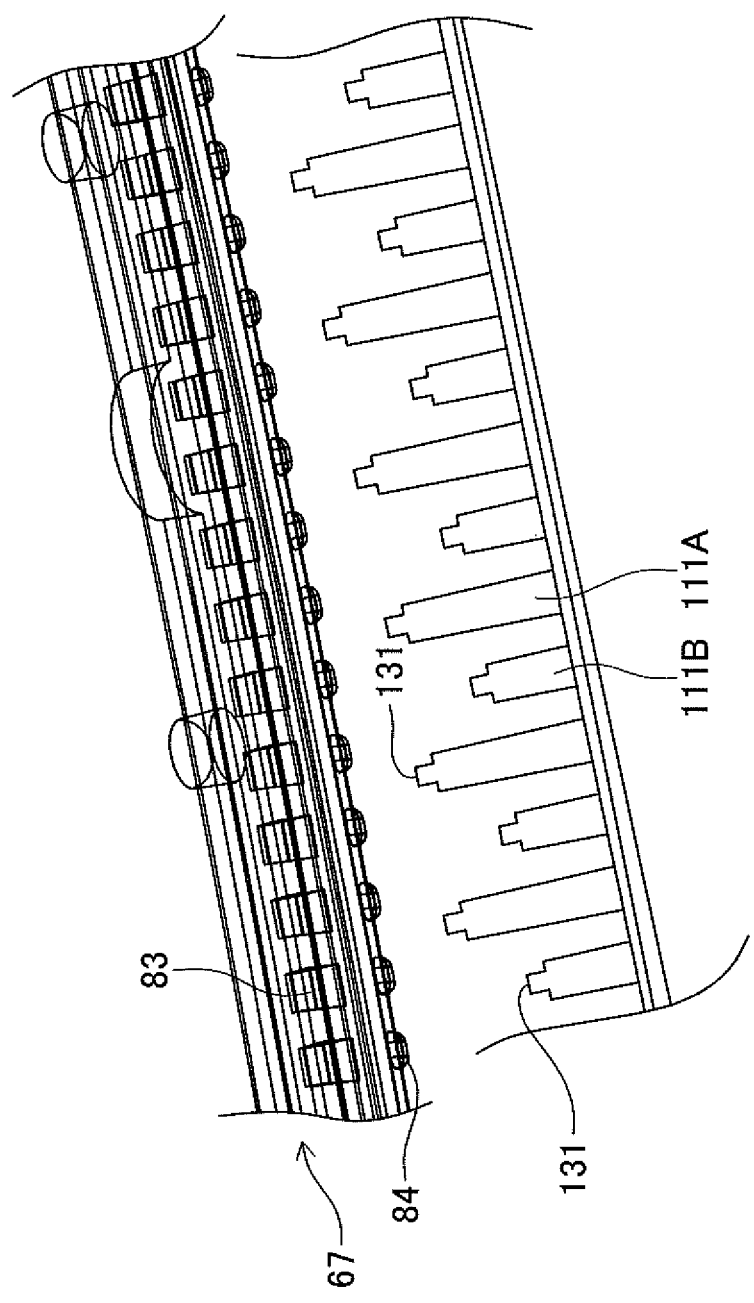
FIG. 41 is an enlarged view of a rib part and an outer periphery on the downstream side according to the fifth embodiment.

As illustrated in the fifth embodiment of FIG. 41, the tip part 131 of the rib part 111 may be formed into a convex shape. As illustrated in FIG. 41, the tip part 131 of the rib part 111 on the upstream side protrudes in the convex shape toward the upstream side. The center part of the tip part 131 in the lateral direction is protruded on the upstream side. In the rib part 111 having the above shape, since the air conditioning air passing through the space S2 is divided by the convex-shaped tip part 131, the vortex flows are disturbed, thereby suppressing the abnormal noise.

14. The Sixth Embodiment

Figure 42:
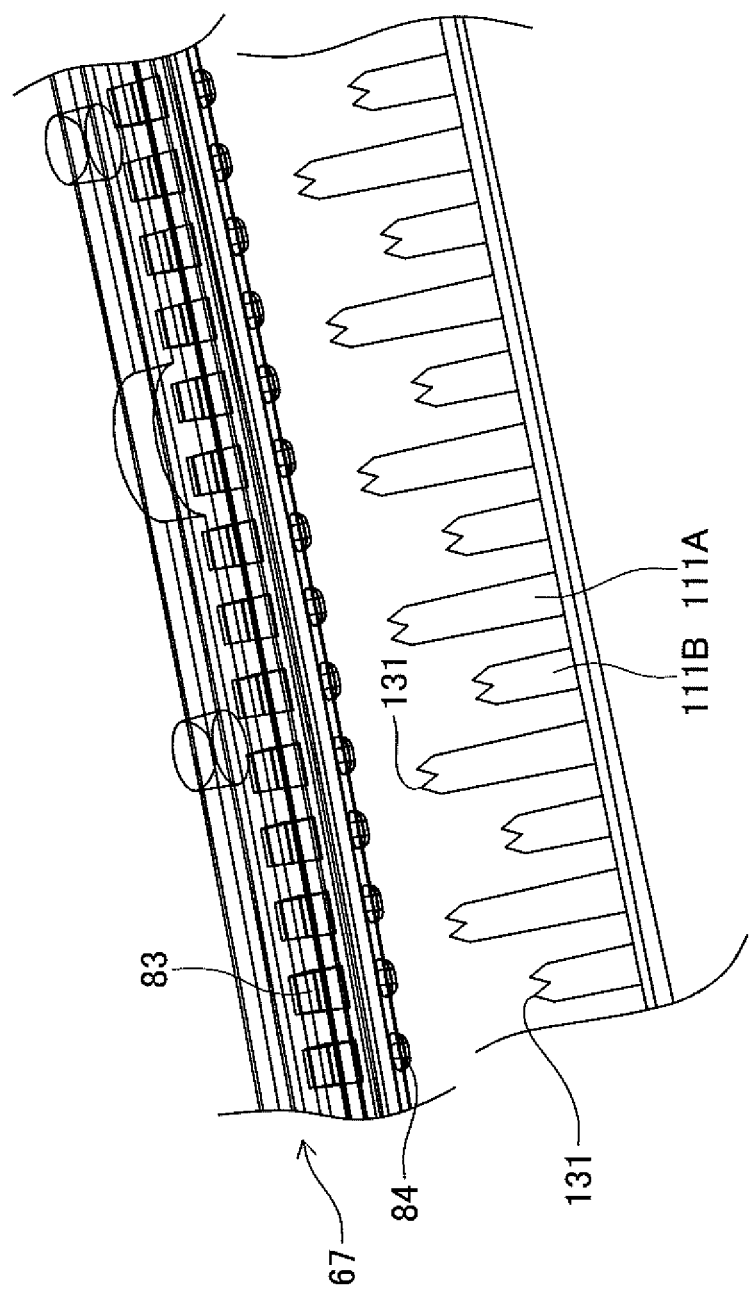
FIG. 42 is an enlarged view of a rib part and an outer periphery on the downstream side according to the sixth embodiment.

As illustrated in the sixth embodiment of FIG. 42, the tip part 131 of the rib part 111 may be formed into a shape cut out in W-shape. As illustrated in FIG. 42, the tip part 131 of the rib part 111 on the upstream side is formed into a shape cut out in the W-shape when seen from one side in the vertical direction. The center part of the tip part 131 in the lateral direction is cut out at the acute angle toward the downstream side. Alco, the tip part 131 has two acute angle parts pointed in the triangular shape of the acute angle so as to interpose a vertex of the cut-out part from both sides in the lateral direction. The two pointed acute angle protrudes by the same lengths to the upstream side. In the rib part 111 having the above shape, the air conditioning air passing through the space S2 is divided by the W-shaped tip part 131, and thus the vortex flows 127 are disturbed, thereby suppressing the abnormal noise.

Since the present invention is not limited to the above embodiment, the various changes, substitutions, and alterations could be made hereto without departing from the spirit and scope of the invention.

For example, the shape of the rib part 111 in each of the above embodiments is one example. The rib part 111 may have a square pole shape and a cylindrical shape.

Also, the air adjusted by the register 10 is not limited to air conditioning air adjusted by an air conditioner. For example, the register 10 may deflect the wind direction of the outside air introduced from outside.

The rib part 111 may be configured by combining the lengths L1, L2, and L3, the shape of the tip part 131, and the height H in the each of the above embodiments.

Although the first rib part 111A and the second rib part 111B are alternately arranged in the above first embodiment, the present invention is not limited to the above arrangement. For example, the combination of an arrangement wherein the two first rib parts 111A is arranged, and then the one second rib part 111B is arranged may be repeated.

Also, although the rib part 111 is arranged at the position close to the tip part on the downstream side 91, the rib part 111 and the tip part on the downstream side 91 may be arranged at a position away from each other to some extent. For example, the position of the damper 19 may be moved to the upstream side relative to the position in the first embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

10 register, 11 retainer, 19 damper, 21 a ventilation flue, 22 a ventilating direction, 43A an inner wall, 61 a left side shaft part (a shaft part), 62 a right side shaft part (a shaft part), 65 an outer periphery on the upstream side, 69 an upper surface, 73 a plate member, 75 a soft seal member, 83 an upper side protrusion part (a protrusion part), 91 a tip part on the downstream side (a tip part of the soft seal member provided in the outer periphery on the downstream side of the plate member), 111 a rib part, 111A a first rib part, 111B a second rib part, L1,L2,L3 A length, S1 a space.

What is claimed is:
1. A register comprising:
  a hollow tubular retainer defining a ventilation flue through which air flows in a ventilating direction;
  a damper provided inside the retainer and turnably supported by the retainer to open and close the ventilation flue following turning of the damper, wherein the damper includes:
a plate member formed into a flat plate shape;
a shaft part supporting the plate member turnably around a turning axis with respect to the retainer; and
a soft seal member provided on an outer periphery of the plate member, wherein the retainer includes:
an inner wall with which the soft seal member is elastically brought into contact when the damper is placed in a closed state,
wherein the inner wall of the retainer includes a plurality of rib parts provided on a downstream side in the ventilating direction relative to the plate member when the damper is in the closed state,
wherein the plurality of rib parts are arranged in a direction parallel to the turning axis, and the rib parts that are immediately adjacent to each other have different shapes from each other, and
wherein the soft seal member is provided with a plurality of protrusion parts that face the plurality of rib parts when the damper is arranged along the ventilating direction,
wherein the plurality of rib parts includes: a first rib part; and a second rib part arranged adjacent to the first rib part,
wherein the first rib part has a height along a height direction orthogonal to the inner wall, the height being identical to a height of the second rib part,
wherein the first rib part has a length along the ventilating direction, the length being longer than a length of the second rib part, and
wherein the first rib part and the second rib part are alternately arranged in the direction parallel to the turning axis.

2. The register according to claim 1, wherein the plurality of rib parts is arranged at a position facing a space provided between the plurality of protrusion parts in the ventilating direction.

3. The register according to claim 1, wherein the plurality of rib parts extends along the ventilating direction, and a corner part of the rib parts on an upstream side in the ventilating direction is formed into a rounded shape.

4. The register according to claim 1, wherein a tip part of the soft seal member provided in the outer periphery on a downstream side of the plate member is arranged close to the plurality of rib parts when the damper is turned to a position where the outer periphery on the downstream side of the plate member faces the plurality of rib parts.

* * * * *